(12) United States Patent
Allen et al.

(10) Patent No.: US 12,434,308 B2
(45) Date of Patent: Oct. 7, 2025

(54) STEP DRILL BIT

(71) Applicant: MILWAUKEE ELECTRIC TOOL CORPORATION, Brookfield, WI (US)

(72) Inventors: Douglas W. Allen, Oconomowoc, WI (US); Courtney D. McCool, Menomonee Falls, WI (US); Smith C. Theiler, Plymouth, WI (US); Richard Hohnl, Jr., Racine, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 419 days.

(21) Appl. No.: 16/831,995

(22) Filed: Mar. 27, 2020

(65) Prior Publication Data

US 2020/0222994 A1 Jul. 16, 2020

Related U.S. Application Data

(60) Division of application No. 16/250,175, filed on Jan. 17, 2019, now Pat. No. 10,695,845, which is a
(Continued)

(51) Int. Cl.
*B23B 51/02* (2006.01)
*B23B 51/00* (2006.01)

(52) U.S. Cl.
CPC ........ *B23B 51/0081* (2013.01); *B23B 51/009* (2013.01); *B23B 51/02* (2013.01); *B23B 51/00* (2013.01); *B23B 2251/40* (2013.01); *B23B 2251/50* (2013.01); *B23B 2251/52* (2013.01); *B23B 2270/36* (2013.01); *Y10T 408/21* (2015.01); *Y10T 408/906* (2015.01)

(58) Field of Classification Search
CPC .............. B23B 51/0081; B23B 51/009; B23B 2251/52; B23B 2260/104; B23B 2270/36; B23B 2251/14; B23B 2251/04
See application file for complete search history.

(56) References Cited

U.S. PATENT DOCUMENTS

| 213,937 A | 4/1879 | Reichardt |
|---|---|---|
| 347,864 A | 8/1886 | Berg |

(Continued)

FOREIGN PATENT DOCUMENTS

| CN | 2623387 Y | 7/2004 |
|---|---|---|
| CN | 2820394 Y | 9/2006 |

(Continued)

OTHER PUBLICATIONS

English translation of DE 20015550, Oct. 2000 (Year: 2000).*
(Continued)

*Primary Examiner* — Alan Snyder
(74) *Attorney, Agent, or Firm* — Michael Best & Friedrich LLP

(57) ABSTRACT

A drill bit includes a shank and a body portion defining a plurality of axially stacked, progressively sized steps. The steps include a first step and a terminal step. The first step defines two tip flutes each disposed at a tip flute angle. The body portion defines a body flute extending through the steps. The drill bit also includes an indicator band formed on a portion of the body flute and a portion of an outer surface of one of the plurality of steps.

20 Claims, 40 Drawing Sheets

Related U.S. Application Data continuation of application No. 15/668,874, filed on Aug. 4, 2017, now Pat. No. 10,252,351, which is a division of application No. 14/297,777, filed on Jun. 6, 2014, now Pat. No. 9,731,358.

(60) Provisional application No. 61/831,926, filed on Jun. 6, 2013.

(56) References Cited

U.S. PATENT DOCUMENTS

| | | |
|---|---|---|
| 499,098 A | 6/1893 | Comstock |
| 550,190 A | 11/1895 | Myers |
| 716,557 A | 12/1902 | Klingensmith |
| 938,484 A | 11/1909 | Hanson |
| 1,620,536 A | 3/1927 | Gairing |
| 2,193,186 A | 3/1940 | Bannister |
| 2,276,532 A | 3/1942 | Welty |
| 2,389,909 A | 11/1945 | Hofbauer |
| 2,555,746 A | 6/1951 | Horsky et al. |
| 2,607,562 A | 8/1952 | Phipps |
| D178,899 S | 10/1956 | Olsen |
| 2,786,373 A | 3/1957 | Patton |
| 2,855,181 A | 10/1958 | Olsen |
| 2,897,696 A | 8/1959 | Tisserant |
| 2,984,130 A | 5/1961 | Lentz |
| 3,076,356 A | 2/1963 | Simich |
| 3,564,945 A | 2/1971 | Bradley |
| 3,645,640 A | 2/1972 | Zukas |
| 3,696,875 A | 10/1972 | Cortes |
| 3,758,222 A | 9/1973 | Oakes |
| 3,768,581 A | 10/1973 | Rederon |
| 3,836,278 A | 9/1974 | McInnes |
| 4,032,251 A | 6/1977 | Ribich |
| 4,073,354 A | 2/1978 | Rowley et al. |
| 4,098,363 A | 7/1978 | Rohde et al. |
| 4,116,578 A | 9/1978 | Gelfand et al. |
| 4,127,355 A | 11/1978 | Oakes |
| 4,189,266 A | 2/1980 | Koslow |
| 4,207,954 A | 6/1980 | Jerome |
| 4,244,432 A | 1/1981 | Rowley et al. |
| 4,351,401 A | 9/1982 | Fielder |
| 4,360,069 A | 11/1982 | Davis |
| 4,561,812 A | 12/1985 | Lindén |
| 4,582,458 A | 4/1986 | Korb et al. |
| 4,662,803 A | 5/1987 | Arnold |
| 4,815,902 A | 3/1989 | Durfee, Jr. |
| 4,932,815 A | 6/1990 | Krauss |
| 5,174,692 A | 12/1992 | Martin |
| 5,273,380 A | 12/1993 | Musacchia |
| 5,288,183 A | 2/1994 | Chaconas et al. |
| 5,326,196 A | 7/1994 | Noll |
| 5,427,477 A | 6/1995 | Weiss |
| 5,452,971 A | 9/1995 | Nevills |
| 5,466,100 A | 11/1995 | Ahluwalia |
| 5,622,462 A | 4/1997 | Gakhar et al. |
| 5,807,039 A | 9/1998 | Booher et al. |
| 5,915,893 A | 6/1999 | Miyanaga |
| 6,021,857 A | 2/2000 | Birk |
| 6,190,097 B1 | 2/2001 | Thomas |
| 6,290,438 B1 | 9/2001 | Papajewski |
| D449,627 S | 10/2001 | Tateno et al. |
| 6,428,250 B2 | 8/2002 | Giebmanns |
| 6,796,759 B2 | 9/2004 | Aasgaard |
| 6,890,133 B2 | 5/2005 | Singh et al. |
| D526,670 S | 8/2006 | Ibey |
| 7,171,871 B2 | 2/2007 | Kozak |
| 7,357,606 B1 | 4/2008 | Pettit et al. |
| 7,455,485 B2 | 11/2008 | Boyd et al. |
| 7,458,646 B2 | 12/2008 | Marathe et al. |
| 7,871,224 B2 | 1/2011 | Dost et al. |
| 8,029,215 B2 | 10/2011 | Gentry et al. |
| 8,070,397 B2 | 12/2011 | Durfee |
| 8,070,398 B2 | 12/2011 | Durfee |
| 8,215,206 B2 | 7/2012 | Kozak et al. |
| 8,388,280 B1 | 3/2013 | Ison et al. |
| 8,764,355 B2 | 7/2014 | Durfee |
| 8,784,017 B2 | 7/2014 | Ibarra et al. |
| 9,676,041 B2 | 6/2017 | Allen |
| 10,058,929 B2 | 8/2018 | Durfee |
| 10,245,656 B2 | 4/2019 | Piper et al. |
| 10,328,500 B2 | 6/2019 | Morton et al. |
| 10,421,130 B2 | 9/2019 | Van Essen et al. |
| D872,783 S | 1/2020 | Parendo et al. |
| D881,241 S | 4/2020 | Parendo et al. |
| D892,183 S | 8/2020 | Parendo et al. |
| 2001/0010784 A1 | 8/2001 | Giebmanns |
| 2003/0202853 A1 | 10/2003 | Ko et al. |
| 2004/0062619 A1 | 4/2004 | Ruppert |
| 2004/0076483 A1 | 4/2004 | Singh et al. |
| 2004/0129125 A1 | 7/2004 | Colquhoun |
| 2004/0265082 A1 | 12/2004 | Abrams |
| 2006/0085005 A1 | 4/2006 | Kenealy, III et al. |
| 2006/0093448 A1 | 5/2006 | Kelsey |
| 2006/0150780 A1 | 7/2006 | Chen |
| 2007/0020057 A1 | 1/2007 | Chen |
| 2007/0264094 A1 | 11/2007 | Seeley |
| 2008/0029311 A1 | 2/2008 | Seeley |
| 2008/0085488 A1 | 4/2008 | Lazarof |
| 2008/0166195 A1 | 7/2008 | Gentry et al. |
| 2008/0166196 A1 | 7/2008 | Zhu |
| 2010/0054881 A1 | 3/2010 | Thomas et al. |
| 2010/0092259 A1 | 4/2010 | Borschert et al. |
| 2010/0254779 A1 | 10/2010 | Wedner |
| 2010/0260567 A1 | 10/2010 | Kauper |
| 2011/0038679 A1 | 2/2011 | Kozak |
| 2011/0091297 A1 | 4/2011 | Itoh et al. |
| 2011/0116884 A1 | 5/2011 | Li |
| 2011/0268517 A1 | 11/2011 | Bomireddy et al. |
| 2012/0082523 A1 | 4/2012 | Bozkurt |
| 2012/0195704 A1 | 8/2012 | White |
| 2014/0023448 A1* | 1/2014 | Yanagida ............... B23B 51/02 408/229 |
| 2014/0369776 A1* | 12/2014 | Durfee ................. B23B 51/009 408/224 |
| 2015/0283625 A1* | 10/2015 | Sato ....................... B23B 51/02 408/230 |

FOREIGN PATENT DOCUMENTS

| | | | |
|---|---|---|---|
| CN | 2822839 Y | 10/2006 | |
| CN | 1891383 A | 1/2007 | |
| CN | 201012402 Y | 1/2008 | |
| CN | 201012404 Y | 1/2008 | |
| CN | 201020559 Y | 2/2008 | |
| CN | 101288912 A | 10/2008 | |
| CN | 201151004 Y | 11/2008 | |
| CN | 201565643 U | 9/2010 | |
| CN | 201579463 U | 9/2010 | |
| DE | 1041324 B | 10/1958 | |
| DE | 246060 | 5/1987 | |
| DE | 19526686 A1 | 3/1996 | |
| DE | 29703475 U1 | 6/1997 | |
| DE | 29904042 | 7/1999 | |
| DE | 29904042 U1 | 7/1999 | |
| DE | 19903276 A1 | 8/2000 | |
| DE | 20015550 U1 | 10/2000 | |
| DE | 19950390 A1 | 4/2001 | |
| DE | 20303656 U1 | 6/2003 | |
| DE | 20318529 U1 | 5/2005 | |
| DE | 202008000368 U1 * | 4/2008 | ........... B23B 49/005 |
| DE | 202010006336 U1 | 9/2010 | |
| DE | 202014010622 | 2/2016 | |
| EP | 0482982 A1 | 4/1992 | |
| EP | 0811449 A2 | 12/1997 | |
| EP | 1340573 B1 | 7/2006 | |
| EP | 1924381 B1 | 7/2009 | |
| EP | 2799171 | 11/2014 | |
| GB | 540073 A | 10/1941 | |
| GB | 2050214 | 1/1981 | |
| GB | 2405820 A | 3/2005 | |
| GB | 2419555 A | 5/2006 | |
| JP | 63016912 A | 1/1988 | |
| JP | 7156007 A | 6/1995 | |

(56) References Cited

FOREIGN PATENT DOCUMENTS

| | | | |
|---|---|---|---|
| JP | 9103905 A | 4/1997 |
| JP | 9212008 A | 8/1997 |
| JP | 9285907 A | 11/1997 |
| JP | 9323209 A | 12/1997 |
| JP | 11239907 A | 9/1999 |
| JP | 2006082420 A | 3/2006 |
| JP | 2007007831 | 1/2007 |
| JP | 2007203396 A | 8/2007 |
| JP | 2014054680 | 3/2014 |
| WO | WO 1983/001215 A1 | 4/1983 |
| WO | WO 2001/010587 A1 | 2/2001 |
| WO | WO 2004082874 | 9/2004 |
| WO | WO 2008/092386 A1 | 8/2008 |
| WO | WO 2014197761 | 12/2014 |

OTHER PUBLICATIONS

English machine translation of DE 202008000368 (Year: 2008).*
RUKO Step Drill Catalog, pp. 59-68, publicly available at least as early as Jun. 2, 2011.
Bosch Step Drill Bit with Spiral Flute, publicly available at least as early as Jun. 2, 2011.
RUKO Tools—Step Drill Bits, vol. 13, e 33-3, publicly available at least as early as Jun. 2, 2011.
International Search Report and Written Opinion for Application No. PCT/US2014/041221 dated Sep. 26, 2014 (21 pages).
German Patent Office Action for Application No. 112014002733.2 dated Mar. 21, 2019 (16 pages including English translation).
European Patent Office Extended Search Report for Application No. 19171221.5 dated Aug. 23, 2019 (14 pages).
United Kingdom Intellectual Property Office Action for Application No. GB1518486.4 dated Nov. 7, 2019 (5 pages).
United Kingdom Intellectual Property Office Search and Examination Report for Application No. GB2002306.5 dated Mar. 26, 2020 (5 pages).

* cited by examiner

TABLE 1: SLIDE TEST (HOLES)

| BRAND | NO. OF HOLES |
|---|---|
| BRAND A | 267.2 |
| BRAND B | 177.2 |
| BRAND C | 207.8 |
| DUAL-RELIEF | 814.2 |
| SINGLE-RELIEF | 420.5 |
| BRAND D | 151.6 |

TABLE 2: CLAUSING TEST (HOLES)

| BRAND | NO. OF HOLES |
|---|---|
| BRAND E | 416.2 |
| BRAND A | 431 |
| BRAND B | 179.8 |
| BRAND C | 83.4 |
| DUAL-RELIEF | 554.2 |
| SINGLE-RELIEF | 311.75 |

TABLE 3: SLIDE TEST (CUT TIME)

| BRAND | CUT TIME |
|---|---|
| BRAND A | 11.54 |
| BRAND B | 26.12 |
| BRAND C | 12.02 |
| DUAL-RELIEF | 10.52 |
| SINGLE-RELIEF | 12.95 |
| BRAND D | 22.92 |

TABLE 4: CLAUSING TEST (CUT TIME)

| BRAND | CUT TIME |
|---|---|
| BRAND E | 11.1 |
| BRAND A | 10.18 |
| BRAND B | 19.62 |
| BRAND C | 13.12 |
| DUAL-RELIEF | 10.68 |
| SINGLE-RELIEF | 10.45 |

TABLE 5: CLAUSING TEST (TIP TIME)

| BRAND | TIP TIME |
|---|---|
| BRAND E | 6.32 |
| BRAND A | 6.82 |
| BRAND B | 11.1 |
| BRAND C | 8 |
| DUAL-RELIEF | 5.56 |
| SINGLE-RELIEF | 5.3 |

FIG. 53

STEP DRILL BIT

CROSS-REFERENCE TO RELATED APPLICATIONS

This application is a divisional of U.S. patent application Ser. No. 16/250,175 (U.S. Pat. No. 10,695,845), filed Jan. 17, 2019, which is a continuation of U.S. patent application Ser. No. 15/668,874 (now U.S. Pat. No. 10,252,351), filed Aug. 4, 2017, which is a divisional of U.S. patent application Ser. No. 14/297,777 (now U.S. Pat. No. 9,731,358), filed Jun. 6, 2014, and claims priority to U.S. Provisional Patent Application No. 61/831,926, filed Jun. 6, 2013, the entire contents of all of which are incorporated by reference herein.

BACKGROUND

The present invention relates to power tool accessories. More specifically, the present invention relates to step drill bits.

Step drill bits are used in a variety of applications and industries where a user may need to drill holes through a thin-walled work piece. A step drill bit allows a user to drill holes in a progressive range of sizes with a single bit.

SUMMARY

In one embodiment, the invention provides a drill bit including a shank extending along a bit axis, a transition portion coupled to the shank, and a body portion having a distal end and defining a plurality of axially stacked, progressively sized steps. The plurality of steps includes a first step at the distal end and a terminal step coupled to the transition portion. The first step defines two tip flutes each disposed at a tip flute angle from the bit axis. The body portion further defines two body flutes each extending from the first step to the transition portion and disposed at a body flute angle different from the tip flute angle. The drill bit also includes a bit tip disposed at the distal end of the body portion and having a chisel edge intersecting the bit axis, a first chisel surface being on one side of the chisel edge, and a second chisel surface being on an opposite side of the chisel edge. The first chisel surface defines a first relief angle. The second chisel surface defines a second relief angle that is different from the first relief angle.

In another embodiment, the invention provides a drill bit including a shank extending along a bit axis, a transition portion coupled to the shank, and a body portion having a distal end and defining a plurality of axially stacked, progressively sized steps. The plurality of steps includes a first step at the distal end and a terminal step coupled to the transition portion. The body portion further defines a body flute extending from the first step to the transition portion. The drill bit also includes an indicator band formed on an outer surface of one of the plurality of steps.

In yet another embodiment, the invention provides a drill bit including a shank extending along a bit axis, a transition portion coupled to the shank, and a body portion having a distal end and defining a plurality of axially stacked, progressively sized steps. The plurality of steps includes a first step at the distal end and a terminal step coupled to the transition portion. The body portion further defines a body flute having a flute surface extending from the first step to the transition portion. The drill bit also includes indicia on the flute surface. The indicia correspond to axial depths of the plurality of steps. Less than half of the indicia include markings to differentiate the corresponding indicia from the other indicia.

In still another embodiment, the invention provides a drill bit including a shank extending along a bit axis, a transition portion coupled to the shank, and a body portion having a distal end and defining a plurality of axially stacked, progressively sized steps. The plurality of steps includes a first step at the distal end and a terminal step coupled to the transition portion. Each step includes an axial relief formed on an edge of the step closest to the distal end. The body portion further defines a body flute extending from the first step to the transition portion. A difference in hole diameters formed by each pair of adjacent steps of the plurality of steps is less than 0.1 inches.

Other aspects of the invention will become apparent by consideration of the detailed description and accompanying drawings.

BRIEF DESCRIPTION OF THE DRAWINGS

FIG. 53 is tabulated performance data comparing the step drill bit of FIG. 1 to other step drill bits.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
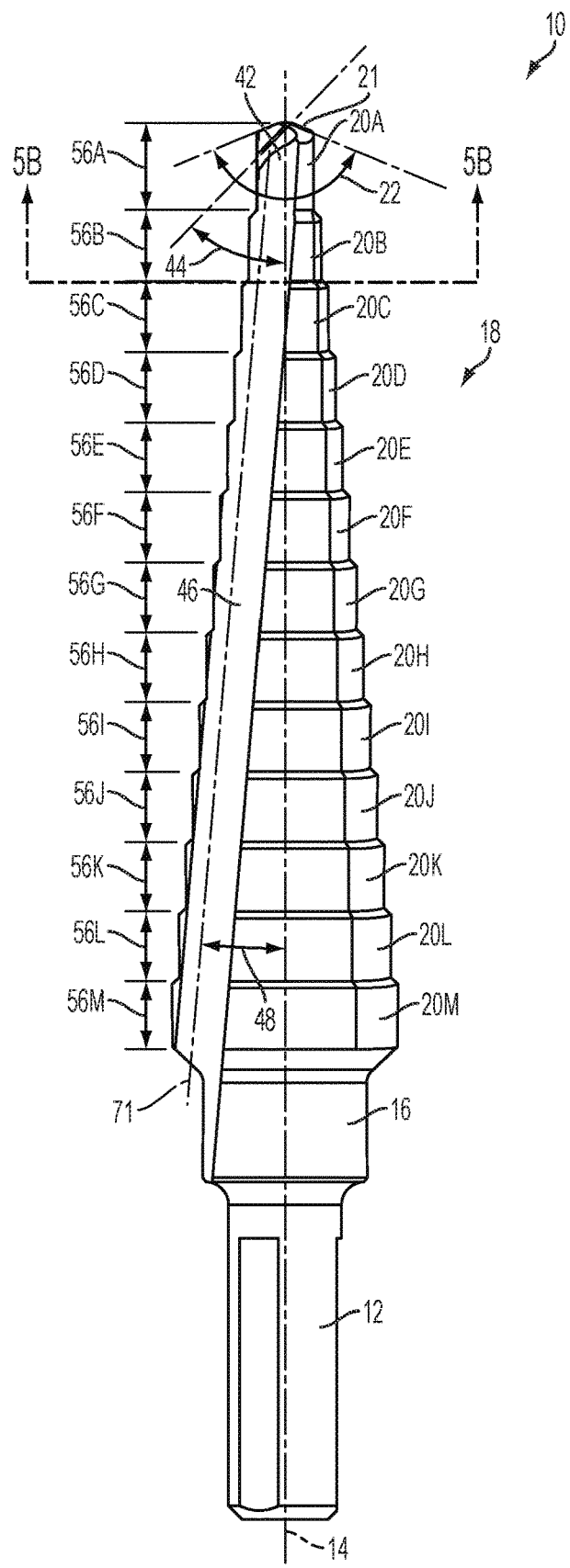
FIG. 1 is a side view of a step drill bit according to one embodiment of the invention.
Figure 2:
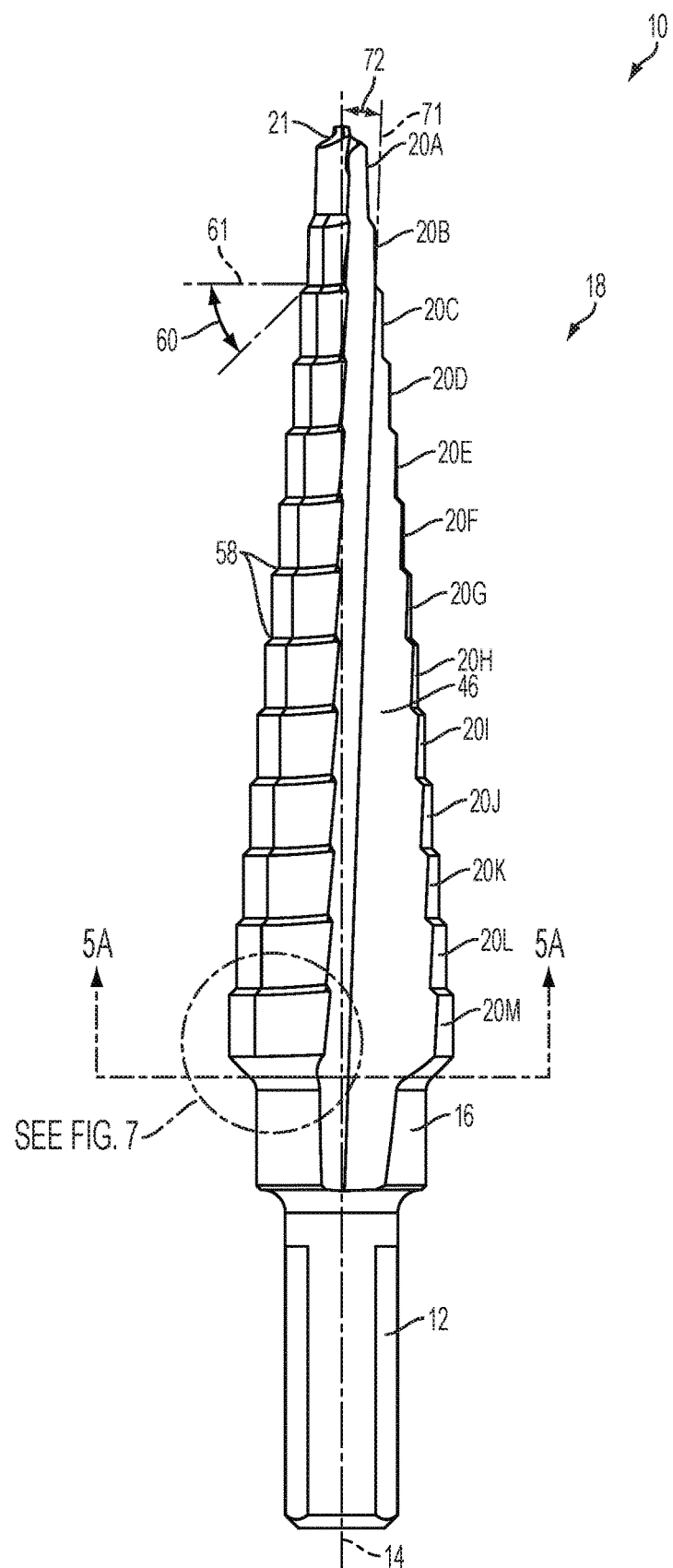
FIG. 2 is another side view of the step drill bit of FIG. 1 rotated 90 degrees.

FIGS. 1 and 2 illustrate a step drill bit 10 including a shank 12, a transition portion 16, and a body portion 18. The shank 12 is configured to engage a power tool for rotation of the step drill bit 10 about a bit axis 14. The transition portion 16 is defined between the shank 12 and the body portion 18. The body portion 18 defines thirteen axially stacked, progressively sized steps 20A-20M between a bit tip 21 and the transition portion 16. The steps 20A-20M are axially stacked in that the steps 20A-20M are coaxially arranged along the bit axis 14. In addition, the steps 20A-20M are progressively sized in that the steps 20A-20M incrementally increase in size (e.g., diameter) from the bit tip 21, or distal end, of the body portion 18 to the transition portion 16.

As shown in FIG. 1, each of the thirteen steps 20A-20M of the body portion 18 has a step height 56A-56M. The step heights 56A-56M are not required to be the same for all steps. For example, in some embodiments, steps that correspond to commonly-used drill diameters (e.g., 0.5 inch, 0.75 inch, etc.) may have larger heights to allow a user to more easily control the step drill bit to stop at those corresponding steps. The illustrated steps include a first step 20A at the distal end of the body portion 18 and a terminal step 20M coupled to the transition portion 16. In the illustrated embodiment, the first step 20A has a diameter of approximately 0.125 inches, and the terminal step 20M has a diameter of approximately 0.505 inches. The intermediate steps 20B-20L located between the first and terminal steps 20A, 20M have incrementally increasing diameters within the range of 0.125 inches and 0.505 inches. In other embodiments, as further described below, the body portion 18 may include fewer or more steps, and/or each step 20A-20M may have a different diameter.

As shown in FIG. 2, a step chamfer 58 is formed between each pair of adjacent steps 20A-20M. The step chamfer 58 connects two adjacent steps at a ramp angle 60 to provide smoother transition between the adjacent steps. The ramp angle 60 is measured between a surface of the corresponding step chamfer 58 and a plane 61 extending perpendicular to the bit axis 14. In the illustrated embodiment, the ramp angle 60 for all of the step chamfers 58 is between approximately 40 degrees and approximately 50 degrees, and more specifically, approximately 45 degrees. In other embodiments, the ramp angle 60 may be relatively larger or smaller, or the step chamfers 58 may be omitted.

Figure 3:
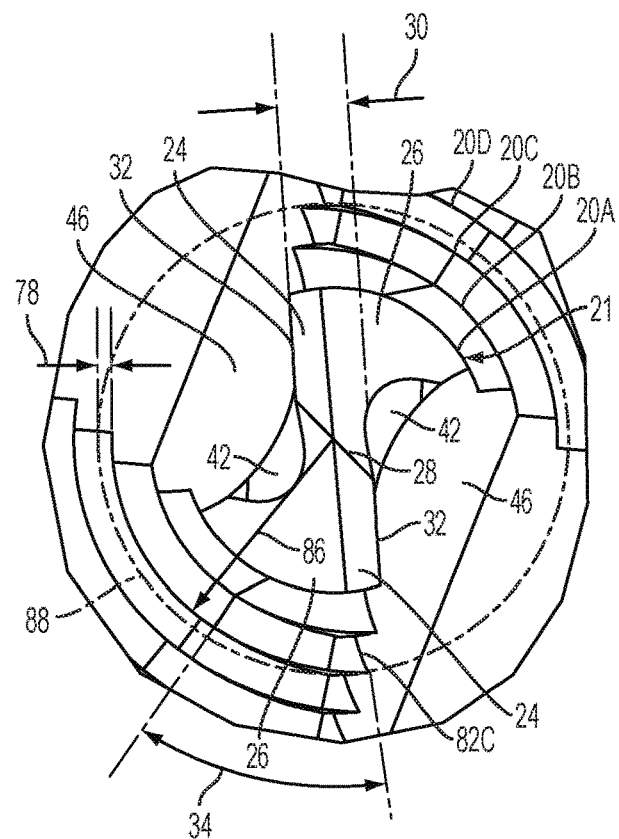
FIG. 3 is an enlarged top view of the step drill bit of FIG. 1.

Referring back to FIG. 1, the bit tip 21 has a primary tip angle 22 measured through the bit axis 14 of between approximately 130 degrees and approximately 140 degrees, and more specifically, approximately 135 degrees. As shown in FIG. 3, the bit tip 21 is a dual-relief tip having two first chisel surfaces 24 and two second chisel surfaces 26. Each first chisel surface 24 is located on an opposite side of a chisel edge 28 of the bit tip 21 from a corresponding second chisel surface 26. The bit tip 21 defines a chisel width 30 measured between cutting edges 32 of the chisel surfaces 24, 26 of between approximately 0.022 inches and approximately 0.028 inches, and more specifically, approximately 0.025 inches. In other embodiments, the primary tip angle 22 and/or the chisel width 30 may be relatively larger or smaller.

Figure 6:
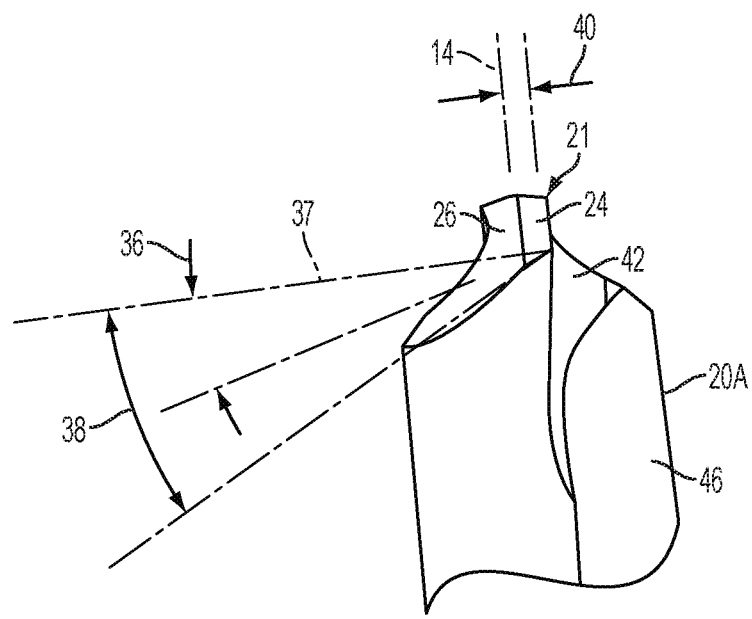
FIG. 6 is an enlarged, partial side view of a portion of the step drill bit of FIG. 1.

As shown in FIG. 6, each first chisel surface 24 has a first chisel surface width 40 of between approximately 0.012 inches and approximately 0.014 inches, and more specifically, approximately 0.013 inches. Each first chisel surface 24 also defines a first chisel relief angle 36, representing the slope of the first chisel surface 24 with respect to a reference axis 37 that is perpendicular to the bit axis 14. The first chisel relief angle 36 is between approximately 10 degrees and approximately 20 degrees, and more specifically, approximately 15 degrees. Each second chisel surface 26 defines a second chisel relief angle 38, representing the slope of the second chisel surface 26 with respect to the reference axis 37. The second chisel relief angle 38 is between approximately 25 degrees and approximately 35 degrees, and more specifically, approximately 30 degrees. In other embodiments, the chisel widths 40 and/or the chisel relief angles 36, 37 may be relatively larger or smaller.

Referring back to FIG. 3, the first step 20A further defines dual tip flutes 42 that extend to the bit tip 21. Each of the tip flutes 42 has a u-shaped cross-section with a tip flute radius 52 (FIG. 4) between approximately 0.035 inches and approximately 0.045 inches, and more specifically, approximately 0.045 inches. The tip flutes 42 are in the shape of an approximate quarter-circle, with the ends of the quarter-circle extending at an angle 54 between approximately 85 degrees and approximately 95 degrees, and more specifically, approximately 90 degrees. In other embodiments, the tip flute radii 52 and/or the angles 54 may be relatively larger or smaller.

Figure 4:
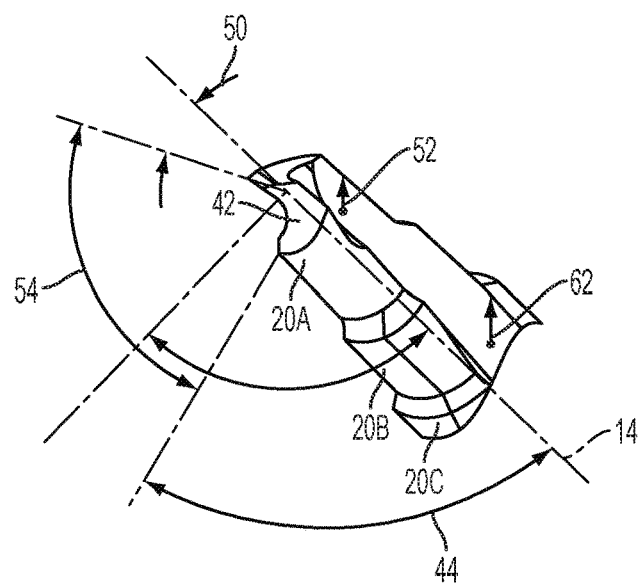
FIG. 4 is an enlarged partial perspective view of a portion of the step drill bit of FIG. 1.

With reference to FIGS. 1 and 4, each tip flute 42 is disposed at a compound angle with respect to the bit axis 14. The compound angle is defined by a first tip flute angle 44 (FIG. 1) and a second tip flute angle 50 (FIG. 4). The two tip flute angles 44, 50 exist in space in one plane, but are identified and measured by viewing the compound angle in two orthogonal planes. The first tip flute angle 44 is measured between a centerline of each tip flute 42 and the bit axis 14 as viewed from a first direction (i.e., from the viewpoint of FIG. 1). The second tip flute angle 50 is measured between the centerline of each tip flute 42 and the bit axis 14 as viewed from a second direction (i.e., from the viewpoint of FIG. 4). In the illustrated embodiment, each first tip flute angle 44 is between approximately 36 degrees and approximately 46 degrees with respect to the bit axis 14 as viewed in FIG. 1, and more specifically, approximately 41 degrees. In addition, each second tip flute angle 50 is between approximately 10 degrees and approximately 20 degrees with respect to the bit axis 14 as viewed in FIG. 4, and more specifically, approximately 15 degrees. In other embodiments, the first tip flute angles 44 and/or the second tip flute angles 50 may be relatively larger or smaller.

Referring to FIGS. 1-2, the body portion 18 defines two body flutes 46 disposed on diametrically opposite sides of the bit axis 14. Each body flute 46 extends from the first step 20A to the transition portion 16. Similar to the tip flutes 42, the body flutes 46 are disposed at compound angles with respect to the bit axis 14. As shown in FIG. 1, a first body flute angle 48 of each body flute 46 is measured between a centerline 71 of the body flute 46 as viewed from a first direction. As shown in FIG. 2, a second body flute angle 72 of each body flute is measured between the centerline 71 of the body flute 46 as viewed from a second direction that is different than the first direction (e.g., when the step drill bit 10 is rotated 90 degrees about the bit axis 14). In the illustrated embodiment, each first body flute angle 48 is between approximately 4.5 degrees and approximately 5.5 degrees with respect to the bit axis 14, and more specifically, approximately 5 degrees. In addition, each second body flute angle 72 is between approximately 1 degree and approximately 3 degrees with respect to the bit axis, and more specifically, approximately 2 degrees. In other embodiments, the first body flute angles 48 and/or the second body flute angles 72 may be relatively larger or smaller.

Figure 5A:
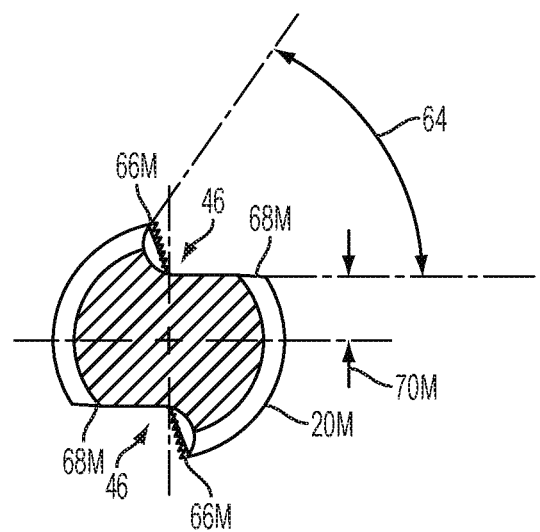
FIG. 5A is a cross-sectional view of the step drill bit of FIG. 2 taken along section line 5A-5A.
Figure 5B:
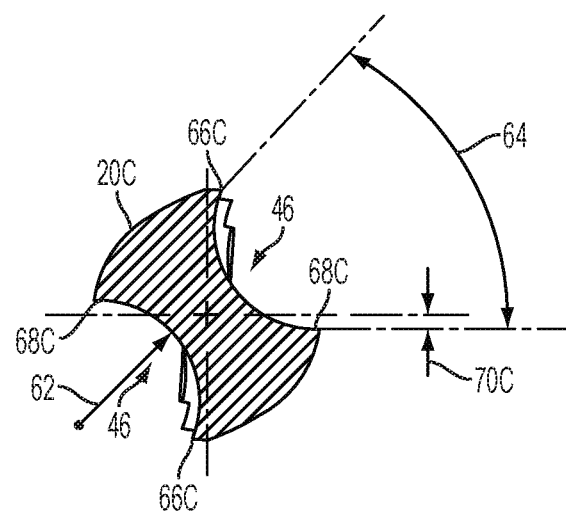
FIG. 5B is a cross-sectional view of the step drill bit of FIG. 1 taken along section line 5B-5B.

With reference to FIGS. 5A and 5B, each body flute 46 is formed with a body flute radius 62 of between approximately 0.06 inches and approximately 0.08 inches, and more specifically, approximately 0.07 inches. Each body flute 46 also defines a body flute span 64, which is measured between an edge 66 and a lip 68 of a corresponding step 20A-20M. In the illustrated embodiment, the body flute span 64 is between approximately 52.5 degrees and approximately 62.5 degrees, and more specifically, approximately 57.5 degrees. Depending on the step, the lip 68 is positioned at an offset 70 from the bit axis 14. The offset 70 may be different for each of the steps 20A-20M. For example, FIG. 5A illustrates the offset 70M for the terminal step 20M, which is approximately 0.14 inches in a first direction. In comparison, FIG. 5B illustrates the offset 70C for the third step 20C, which is approximately 0.01 inches in a second direction.

Figure 7:
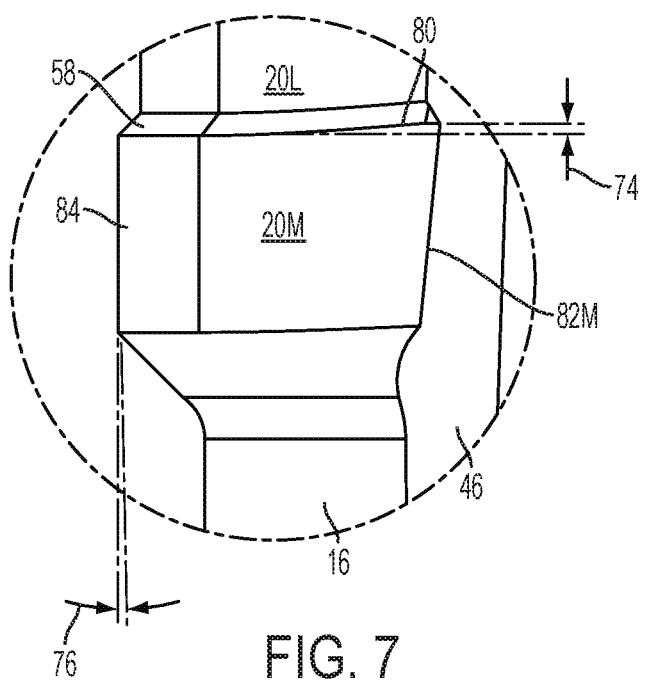
FIG. 7 is an enlarged, partial side view of a portion of the step drill bit of FIG. 2.
Figure 8:
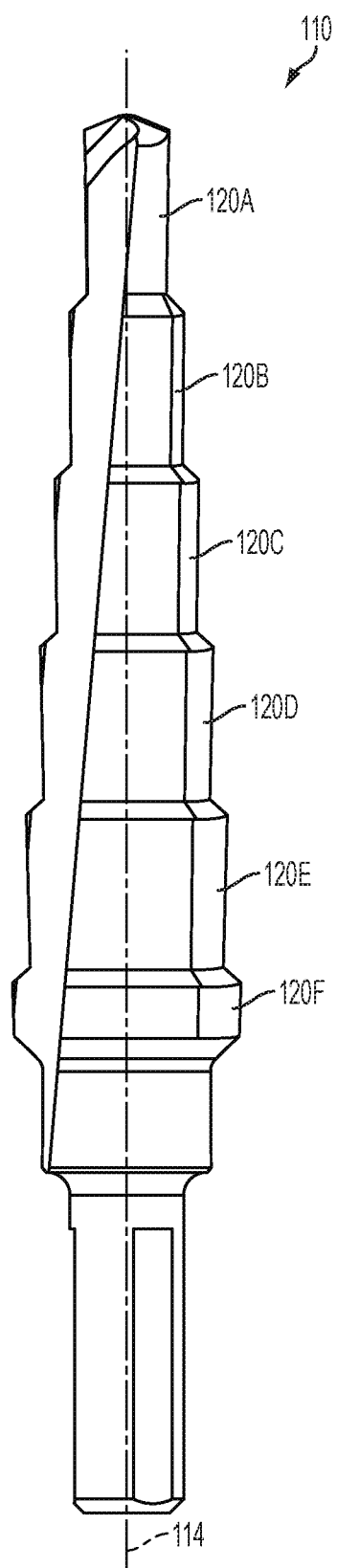
FIG. 8 is a side view of a step drill bit according to another embodiment of the invention.

The thirteen steps 20A-20M of the step drill bit 10 each include three types of reliefs: an axial relief 74 (FIG. 7), a diametral relief 76 (FIG. 7), and a radial relief 78 (FIG. 3). As shown in FIG. 7, the axial relief 74 of each step 20A-20M is the amount by which an upper edge 80 of the step (i.e., the edge of the step closest to the distal end of the body portion 18) translates along the bit axis 14 toward the distal end as the upper edge 80 nears a leading edge 82 of the step (i.e., the edge of the step at the body flute 46). In the illustrated embodiment, the axial relief 74 of each step 20A-20M is between approximately 0.007 inches and approximately 0.013 inches, and more specifically, approximately 0.01 inches. In other embodiments, the axial relief 74 may be relatively larger or smaller.

With continued reference to FIG. 7, the diametral relief 76 of each step 20A-20M is the amount by which an outer circumferential surface 84 of the step tapers radially inward or outward along the bit axis 14. In the illustrated embodiment, the diametral relief 76 of each step 20A-20M is between approximately −1 degrees and approximately 0 degrees. In some embodiments, the diametral relief 76 may be omitted (i.e., may be 0 degrees). In other embodiments, the diametral relief 76 may be a relatively greater degree or may be positive.

With reference to FIG. 3, the radial relief 78 is the amount by which a radius 86 of the steps 20A-20M decreases as the outer surface of the step 20A-20M moves away from the leading edge 82. More particularly, a constant diameter circle 88 is illustrated in FIG. 3 in broken lines, representing the nominal diameter of the third step 20C. The radial relief 78 continuously increases along a radial relief angle 34 from the leading edge 82 of the step to a point at which the radial relief 78 has reached its maximum value or amount. As used herein, the "radial relief" is the maximum amount that the radius 86 of the step 20C decreases radially inward from the nominal diameter 88. In the illustrated embodiment, the radial relief 78 of each step 20A-20M is between approximately 0.002 inches and approximately 0.008 inches, and more specifically, approximately 0.005 inches. In addition, the radial relief angle 34 of each step 20A-20M is between approximately 40 degrees and approximately 50 degrees from the leading edge 82, and more specifically, approximately 45 degrees. In other embodiments, the radial relief 78 and/or the radial relief angle 34 may be relatively larger or smaller.

FIGS. 8-13 illustrate a step drill bit 110 according to another embodiment of the invention. The step drill bit 110 includes features similar to the step drill bit 10 of FIGS. 1-7, and like features have been given like reference numbers plus 100. The step drill bit 110 may include any combination of features, dimensions, or range of dimensions from the preceding or subsequent embodiments, but only features of the step drill bit 110 not yet discussed with respect to the previous embodiment are detailed below.

Figure 9:
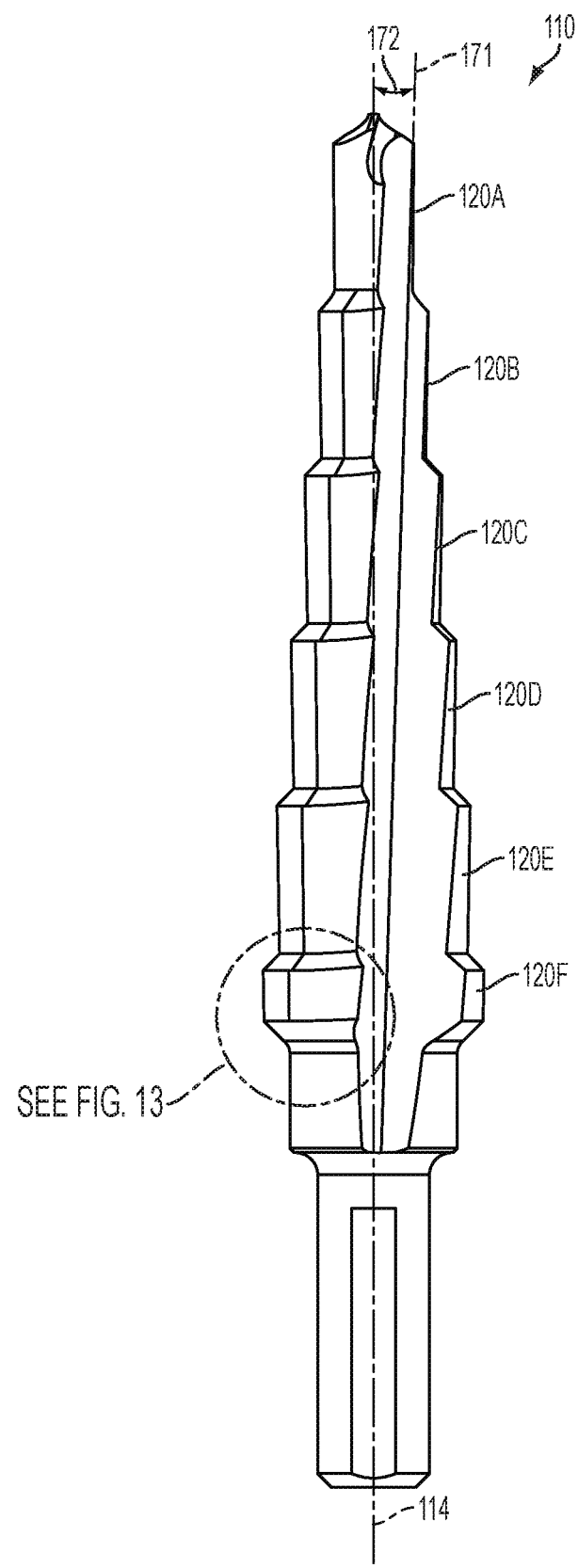
FIG. 9 is another side view of the step drill bit of FIG. 8 rotated 90 degrees.
Figure 10:
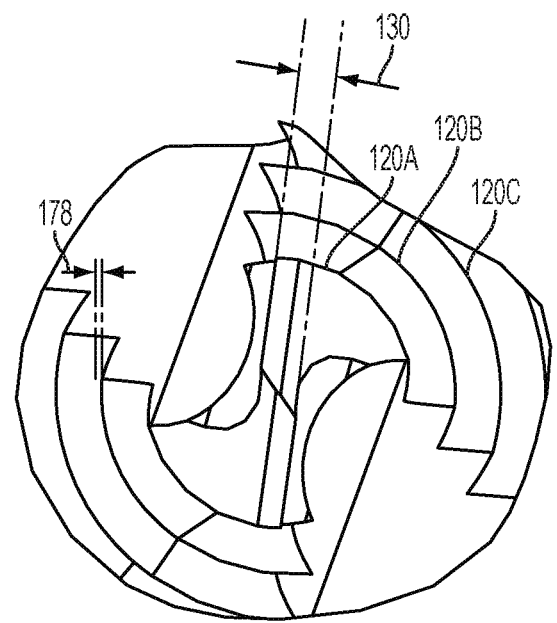
FIG. 10 is an enlarged top view of the step drill bit of FIG. 8.
Figure 11:
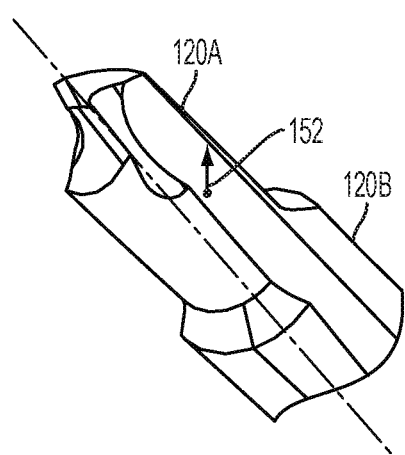
FIG. 11 is an enlarged partial perspective view of a portion of the step drill bit of FIG. 8.
Figure 12:
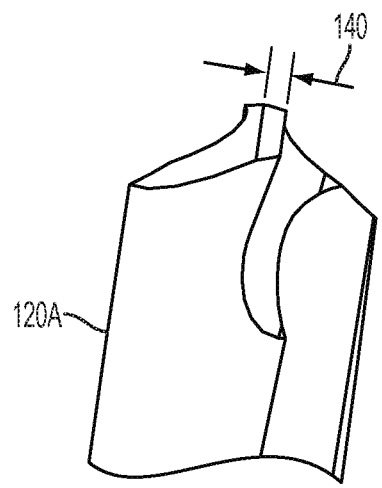
FIG. 12 is an enlarged, partial side view of a portion of the step drill bit of FIG. 9.

The step drill bit 110 includes six axially stacked, progressively sized steps 120A-120F. A first step 120A has a diameter of approximately 0.188 inches, and a terminal step 120F has a diameter of approximately 0.505 inches. With reference to FIG. 9, a second body flute angle 172, defined between a bit axis 114 and a centerline of the body flute radius 171 as viewed from FIG. 9, is between approximately 1.7 degrees and approximately 1.9 degrees, and more specifically, approximately 1.8 degrees. With reference to FIG. 10, the step drill bit 110 includes a chisel width 130 of between approximately 0.029 inches and approximately 0.035 inches, and more specifically, approximately 0.032 inches. With reference to FIG. 12, a first chisel surface width 140 is between approximately 0.011 inches and approximately 0.021 inches, and more specifically, approximately 0.016 inches. A tip flute radius 152 (FIG. 11) of the step drill bit 110 is between 0.055 inches and 0.075 inches, and more specifically, approximately 0.065 inches.

Figure 13:
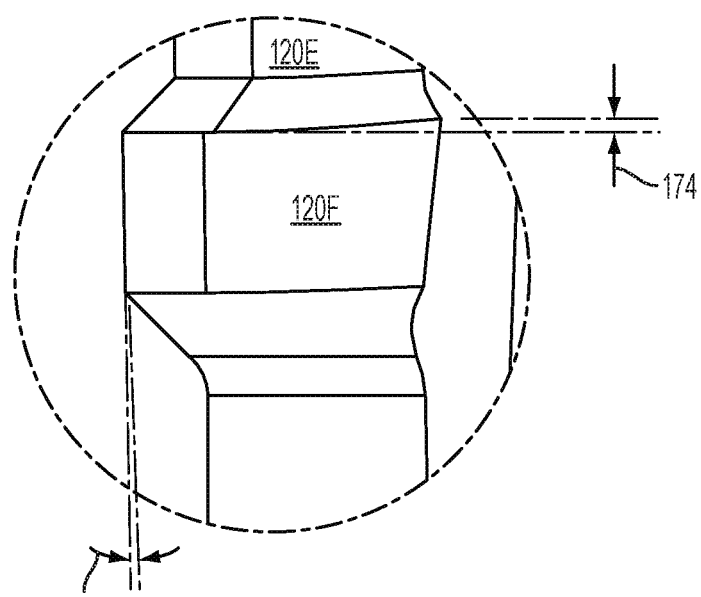
FIG. 13 is an enlarged, partial side view of a portion of the step drill bit of FIG. 9.

As shown in FIG. 10, the step drill bit 110 includes a radial relief 178 that is between approximately 0.002 inches and approximately 0.008 inches, and more specifically, approximately 0.005 inches. As shown in FIG. 13, the step drill bit 110 also includes a diametral relief 176 that is between approximately 0 degrees and approximately 1 degrees, and more specifically, approximately 1 degree. In addition, the step drill bit 110 includes an axial relief 174 that is between approximately 0.007 inches and approximately 0.013 inches, and more specifically, approximately 0.01 inches.

FIGS. 14-17 illustrate a step drill bit 210 according to another embodiment of the invention. The step drill bit 210 includes features similar to the step drill bit 10 of FIGS. 1-7, and like features have been given like reference numbers plus 200. The step drill bit 210 may include any combination of features, dimensions, or range of dimensions from the preceding or subsequent embodiments, but only features of the step drill bit 210 not yet discussed with respect to the previous embodiments are detailed below.

Figure 14:
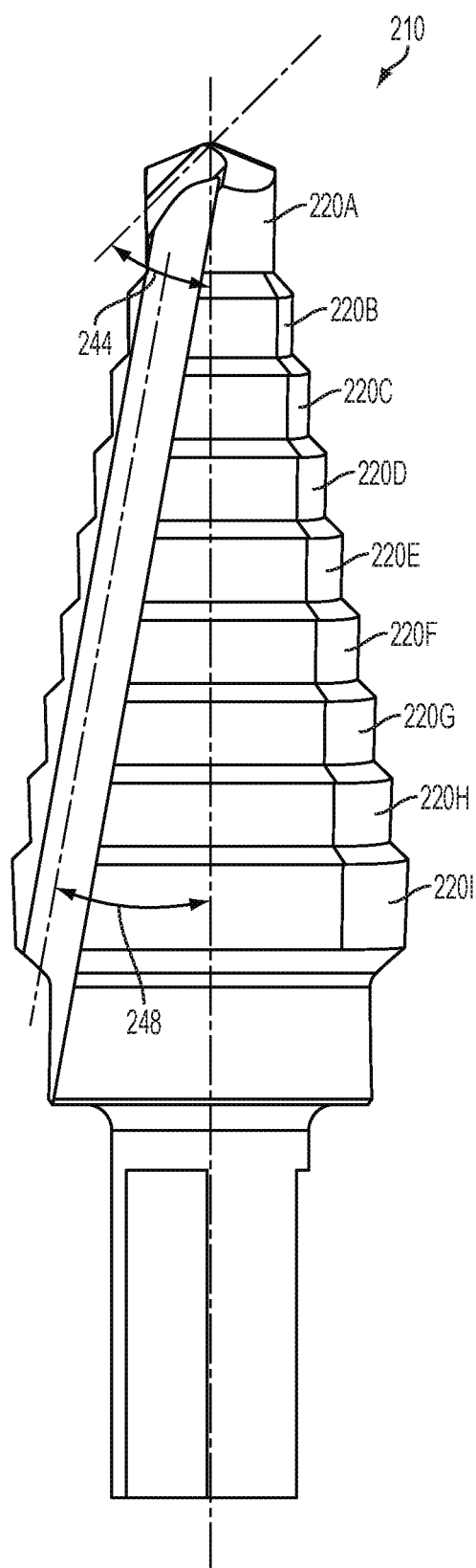
FIG. 14 is a side view of a step drill bit according to another embodiment of the invention.
Figure 15:
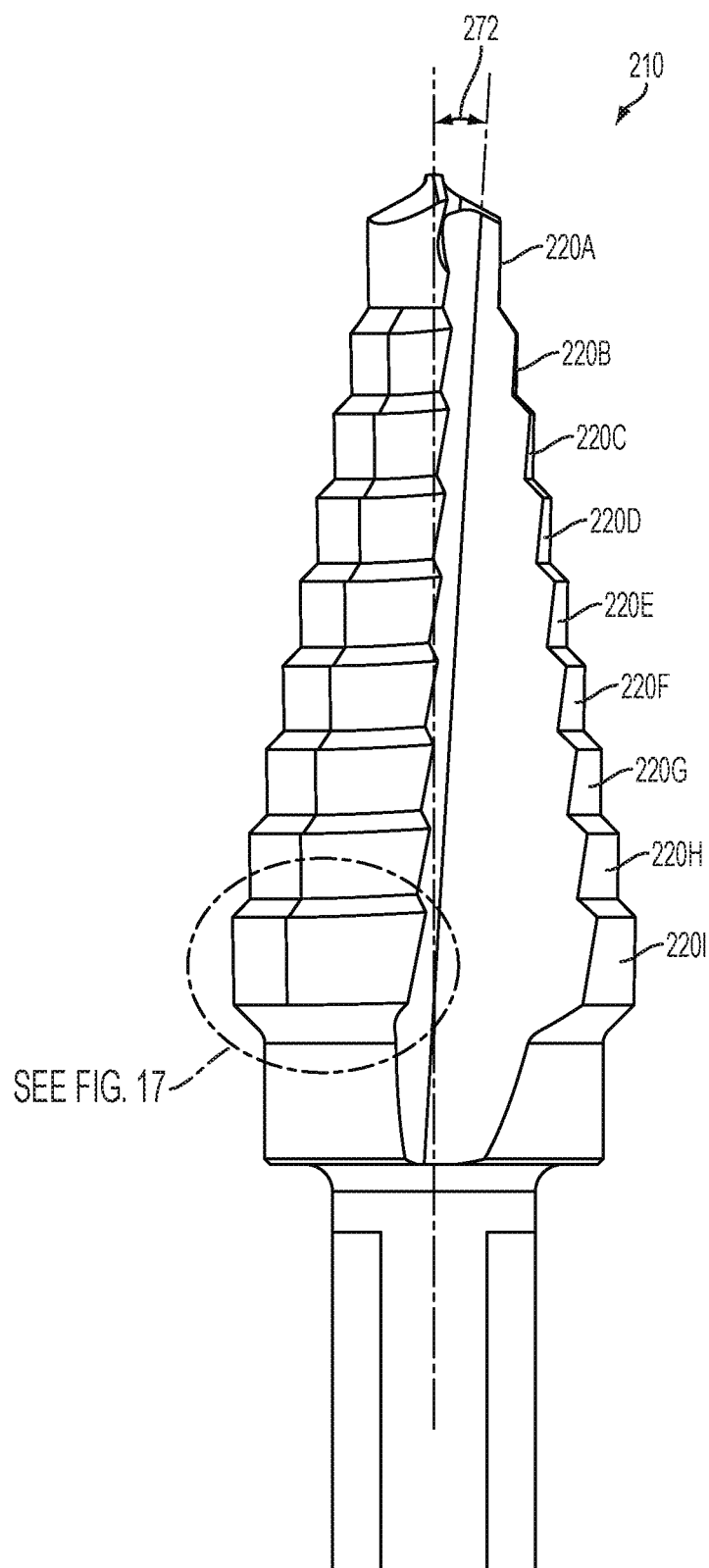
FIG. 15 is a side view of the step drill bit of FIG. 14 rotated 90 degrees.
Figure 16:
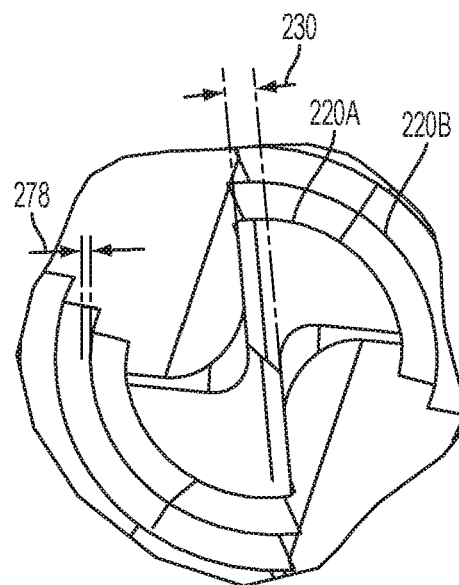
FIG. 16 is an enlarged top view of the step drill bit of FIG. 14.

The step drill bit 210 includes nine axially stacked, progressively sized steps 220A-220I. A first step 220A has a diameter of approximately 0.255 inches, and a terminal step 220I has a diameter of approximately 0.755 inches. With reference to FIG. 14, a tip flute angle 244 is between approximately 54 degrees and approximately 64 degrees, and more specifically, approximately 59 degrees. In addition, a first body flute angle 248 is between approximately 9.2 degrees and approximately 11.2 degrees, and more specifically, approximately 10.2 degrees. With reference to FIG. 15, a second body flute angle 272 is between approximately 2.4 degrees and approximately 4.4 degrees, and more specifically, approximately 3.4 degrees. With reference to FIG. 16, the step drill bit 210 includes a chisel width 230 of between approximately 0.028 inches and approximately 0.034 inches, and more specifically, approximately 0.031 inches.

Figure 17:
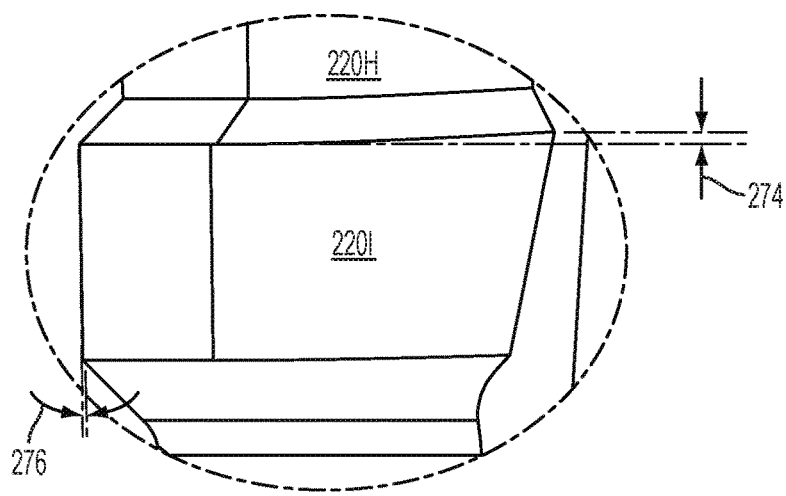
FIG. 17 is an enlarged, partial side view of a portion of the step drill bit of FIG. 15.

As shown in FIG. 16, the step drill bit 210 includes a radial relief 278 that is between approximately 0.002 inches and approximately 0.008 inches, and more specifically, approximately 0.005 inches. As shown in FIG. 17, the step drill bit 210 also includes a diametral relief 276 that is between approximately 0 degrees and approximately 1 degrees, and more specifically, approximately 0.5 degrees. In addition, the step drill bit 210 includes an axial relief 274 that is between approximately 0.007 inches and approximately 0.013 inches, and more specifically, approximately 0.01 inches.

FIGS. 18-21 illustrate a step drill bit 310 according to another embodiment of the invention. The step drill bit 310 includes features similar to the step drill bit 10 of FIGS. 1-7, and like features have been given like reference numbers plus 300. The step drill bit 310 may include any combination of features, dimensions, or range of dimensions from the preceding or subsequent embodiments, but only features of the step drill bit 310 not yet discussed with respect to the previous embodiments are detailed below.

Figure 18:
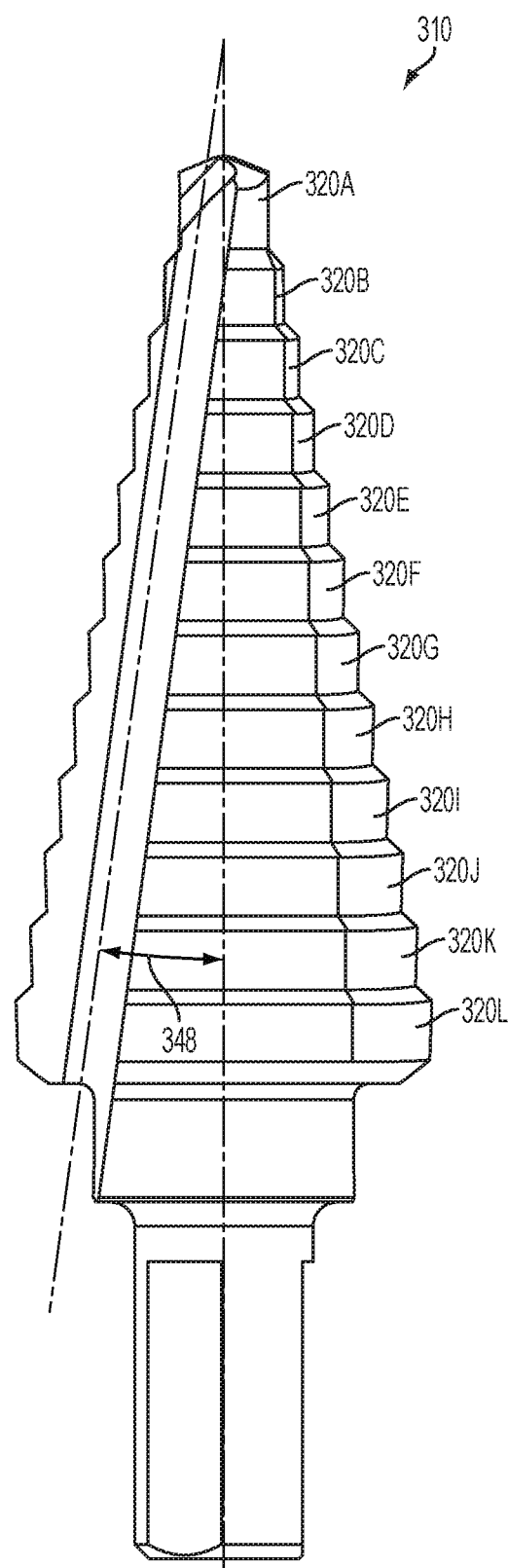
FIG. 18 is a side view of a step drill bit according to another embodiment of the invention.
Figure 19:
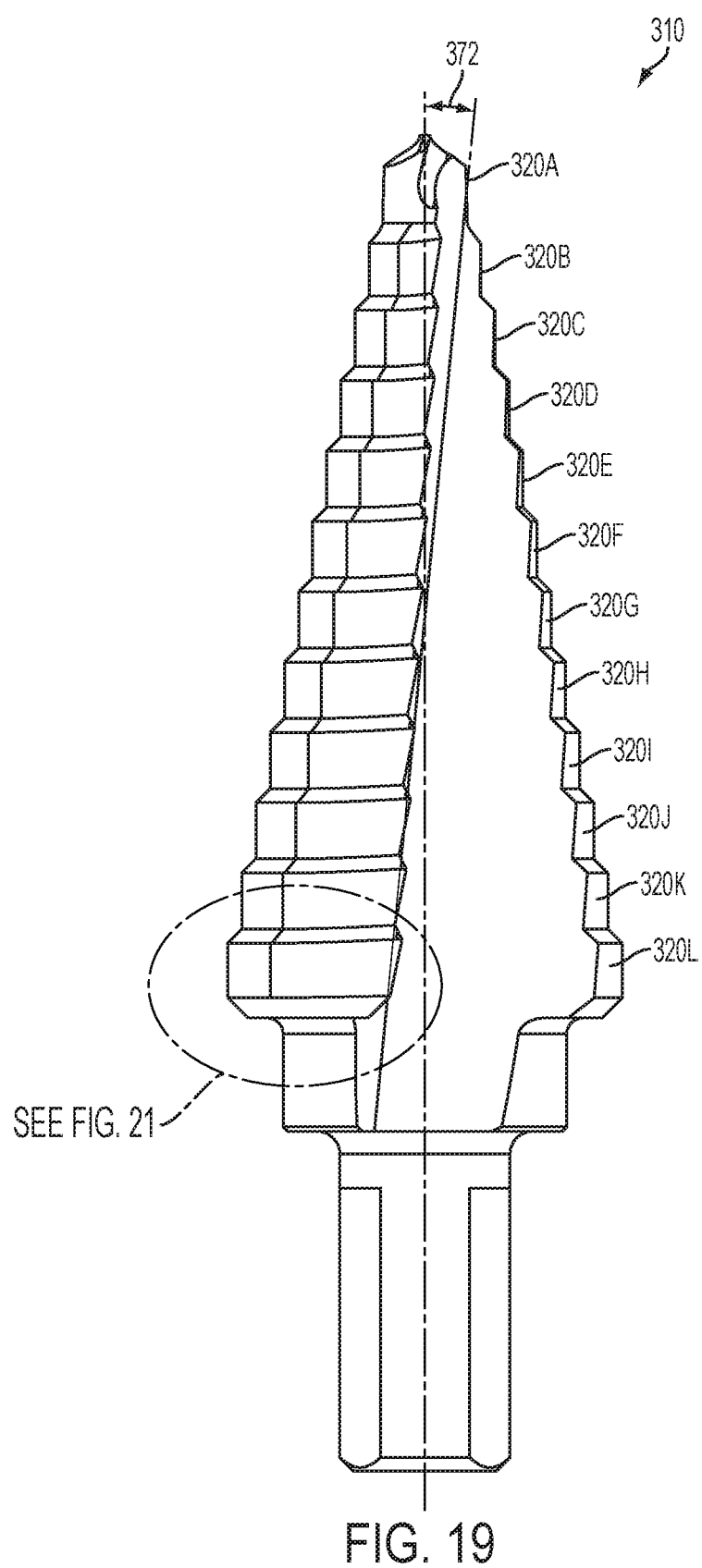
FIG. 19 is another side view of the step drill bit of FIG. 18 rotated 90 degrees.

The step drill bit 310 includes twelve axially stacked, progressively sized steps 320A-320L. A first step 320A has a diameter of approximately 0.188 inches, and a terminal step 320L has a diameter of approximately 0.88 inches. With reference to FIG. 18, the step drill bit 310 includes a first body flute angle 348 that is between approximately 6.8 degrees and approximately 8.8 degrees, and more specifically, approximately 7.8 degrees. With reference to FIG. 19, the step drill bit 310 includes a second body flute angle 372 that is between approximately 4.6 degrees and approximately 6.6 degrees, and more specifically, approximately 5.6 degrees.

Figure 20:
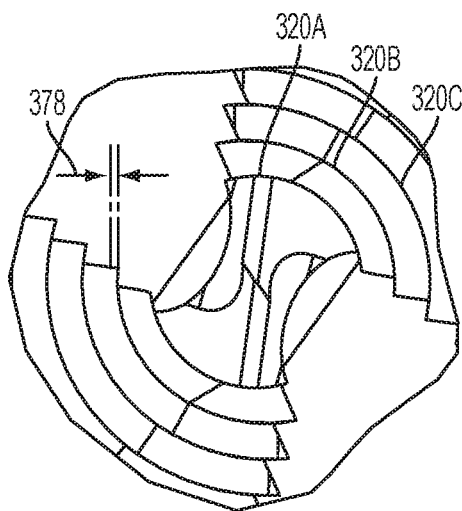
FIG. 20 is an enlarged top view of the step drill bit of FIG. 18.
Figure 21:
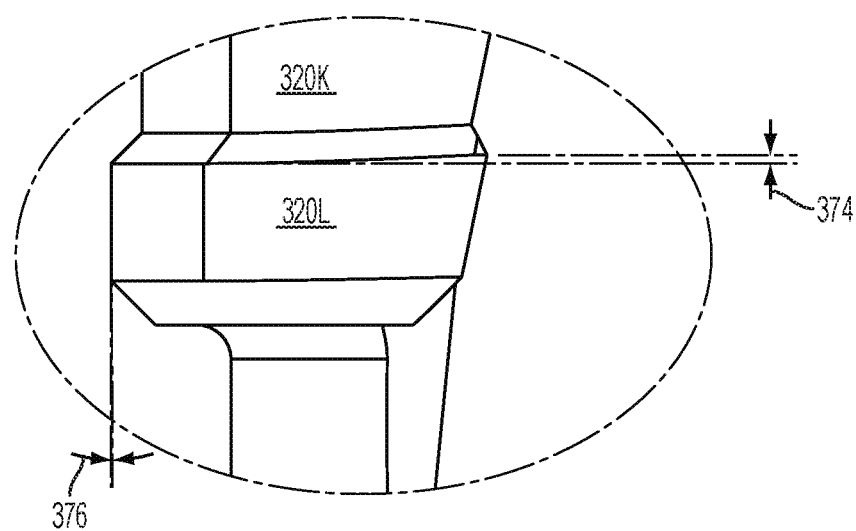
FIG. 21 is an enlarged, partial side view of a portion of the step drill bit of FIG. 19.

As shown in FIG. 20, the step drill bit 310 includes a radial relief 378 that is between approximately 0.002 inches and approximately 0.008 inches, and more specifically, approximately 0.005 inches. As shown in FIG. 21, the step drill bit 310 also includes a diametral relief 376 that is between approximately −1 degrees and approximately 0 degrees, and more specifically, approximately 0 degrees. In addition, the step drill bit 310 includes an axial relief 374 that is between approximately 0.007 inches and approximately 0.013 inches, and more specifically, approximately 0.01 inches.

FIGS. 22-27 illustrate a step drill bit 410 according to another embodiment of the invention. The step drill bit 410 includes features similar to the step drill bit 10 of FIGS. 1-7, and like features have been given like reference numbers plus 400. The step drill bit 410 may include any combination of features, dimensions, or range of dimensions from the preceding or subsequent embodiments, but only features of the step drill bit 410 not yet discussed with respect to the previous embodiments are detailed below.

Figure 22:
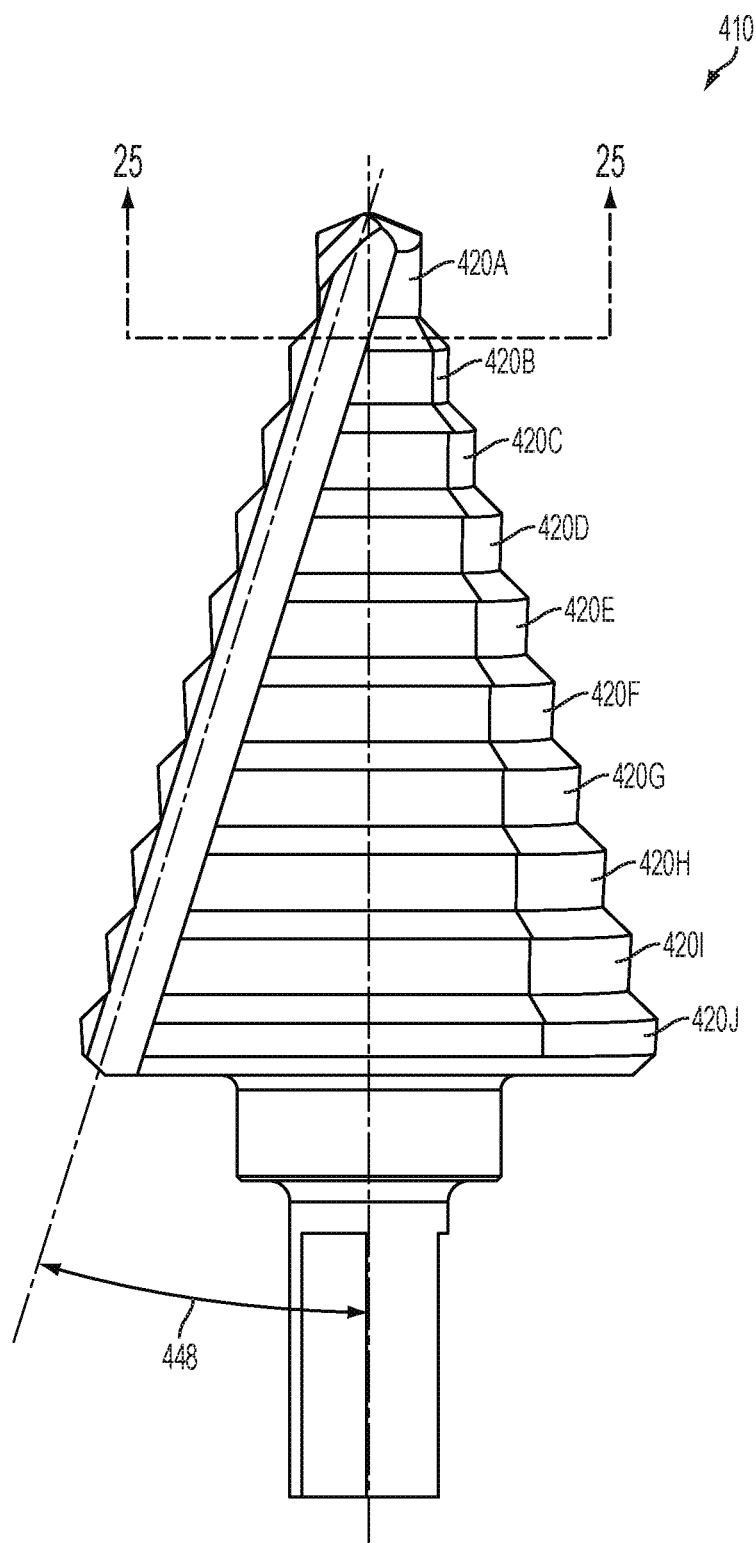
FIG. 22 is a side view of a step drill bit according to another embodiment of the invention.
Figure 23:
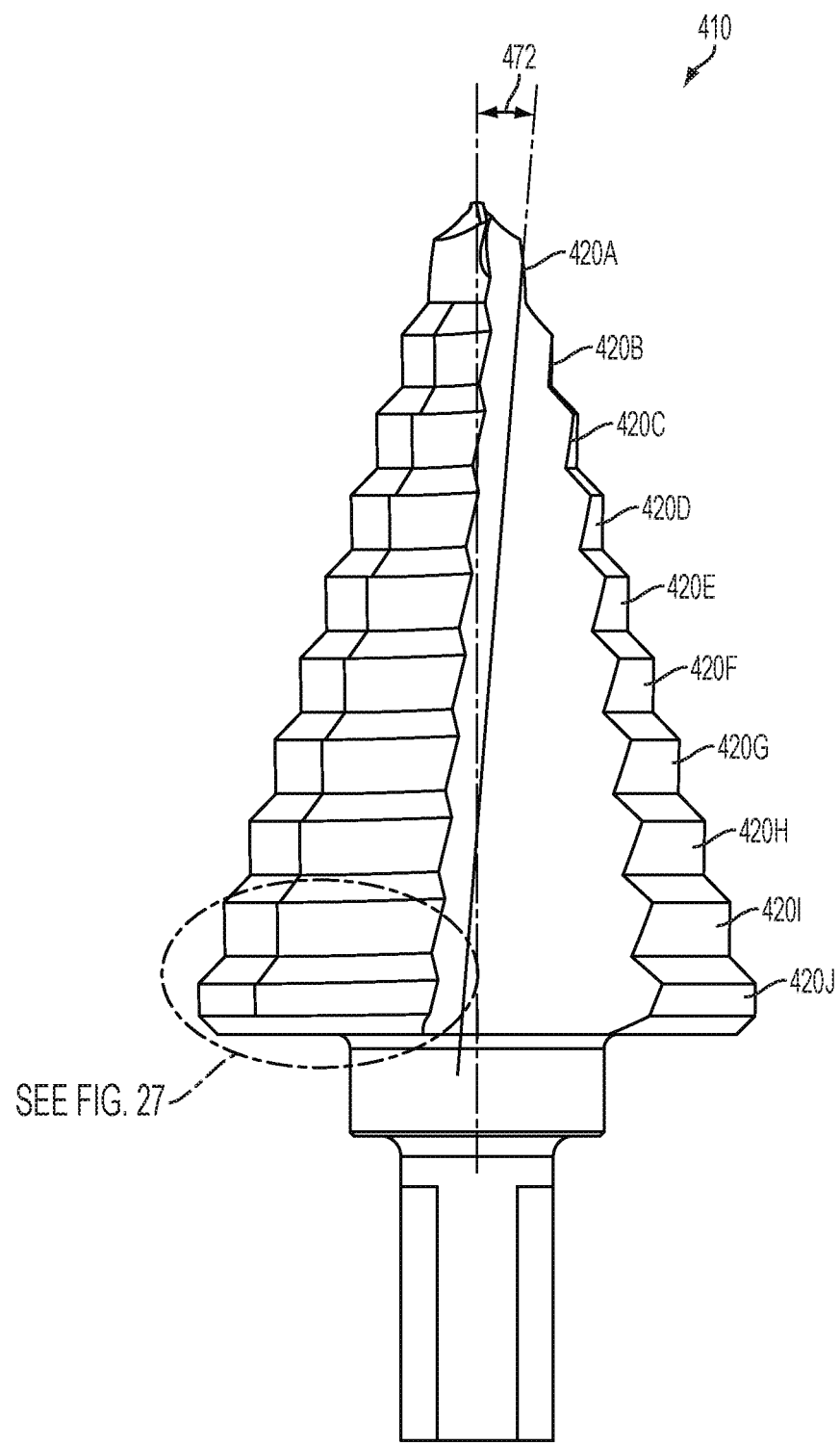
FIG. 23 is another side view of the step drill bit of FIG. 22 rotated 90 degrees.
Figure 24:
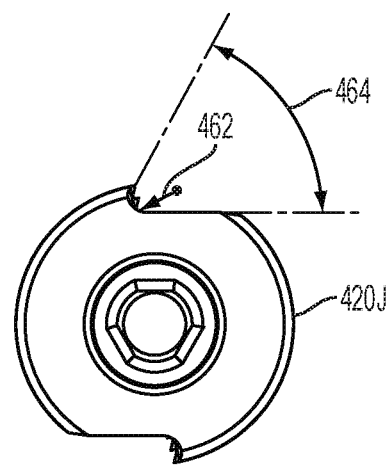
FIG. 24 is a bottom view of the step drill bit of FIG. 22.
Figure 25:
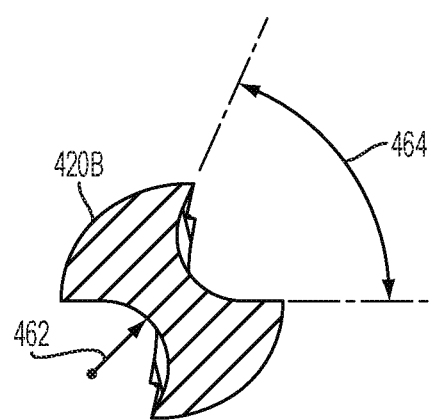
FIG. 25 is a cross-sectional view of the step drill bit of FIG. 22 taken along section line 25-25.

The step drill bit 410 includes ten axially stacked, progressively sized steps 420A-420J. A first step 420A has a diameter of approximately 0.25 inches, and a terminal step 420J has a diameter of approximately 1.38 inches. With reference to FIG. 22, the step drill bit 410 includes a first body flute angle 448 that is between approximately 16.4 degrees and approximately 18.4 degrees, and more specifically, approximately 17.4 degrees. With reference to FIG. 23, the step drill bit 410 includes a second body flute angle 472 that is between approximately 3.6 degrees and approximately 5.6 degrees, and more specifically, approximately 4.6 degrees. With reference to FIGS. 24 and 25, the step drill bit 410 includes a body flute radius 462 that is between approximately 0.084 inches and approximately 0.104 inches, and more specifically, approximately 0.094 inches. In addition, the step drill bit 410 includes a body flute span 464 that is between approximately 61 degrees and approximately 71 degrees, and more specifically, approximately 66 degrees.

Figure 26:
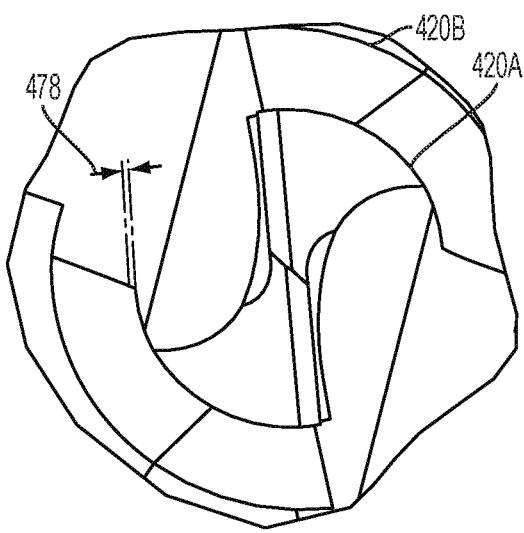
FIG. 26 is an enlarged top view of the step drill bit of FIG. 22.
Figure 27:
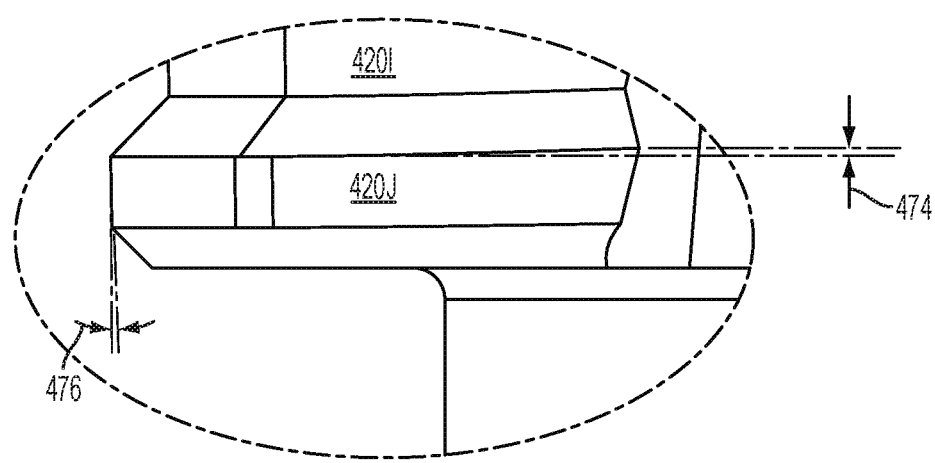
FIG. 27 is an enlarged, partial side view of a portion of the step drill bit of FIG. 23.

As shown in FIG. 26, the step drill bit 410 includes a radial relief 478 that is between approximately 0.002 inches and approximately 0.008 inches, and more specifically, approximately 0.005 inches. As shown in FIG. 27, the step drill bit 410 also includes a diametral relief 476 that is between approximately 0 degrees and approximately 1 degree, and more specifically, approximately 0.5 degrees. In addition, the step drill bit 410 includes an axial relief 474 that is between approximately 0.007 inches and approximately 0.013 inches, and more specifically, approximately 0.01 inches.

FIGS. 28-31 illustrate a step drill bit 510 according to another embodiment of the invention. The step drill bit 510 includes features similar to the step drill bit 10 of FIGS. 1-7, and like features have been given like reference numbers plus 500. The step drill bit 510 may include any combination of features, dimensions, or range of dimensions from the preceding or subsequent embodiments, but only features of the step drill bit 510 not yet discussed with respect to the previous embodiments are detailed below.

Figure 28:
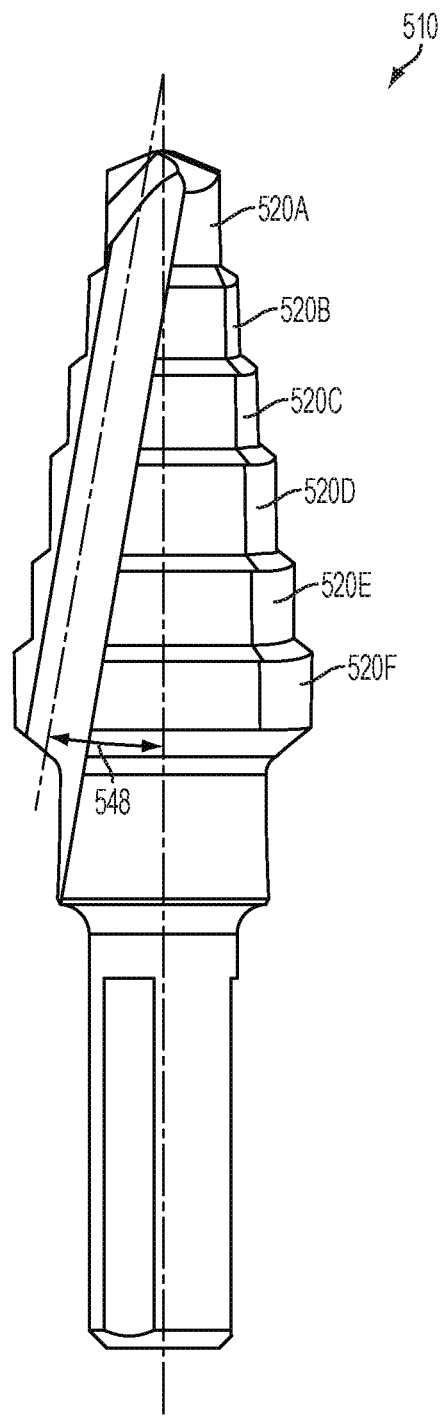
FIG. 28 is a side view of a step drill bit according to another embodiment of the invention.
Figure 29:
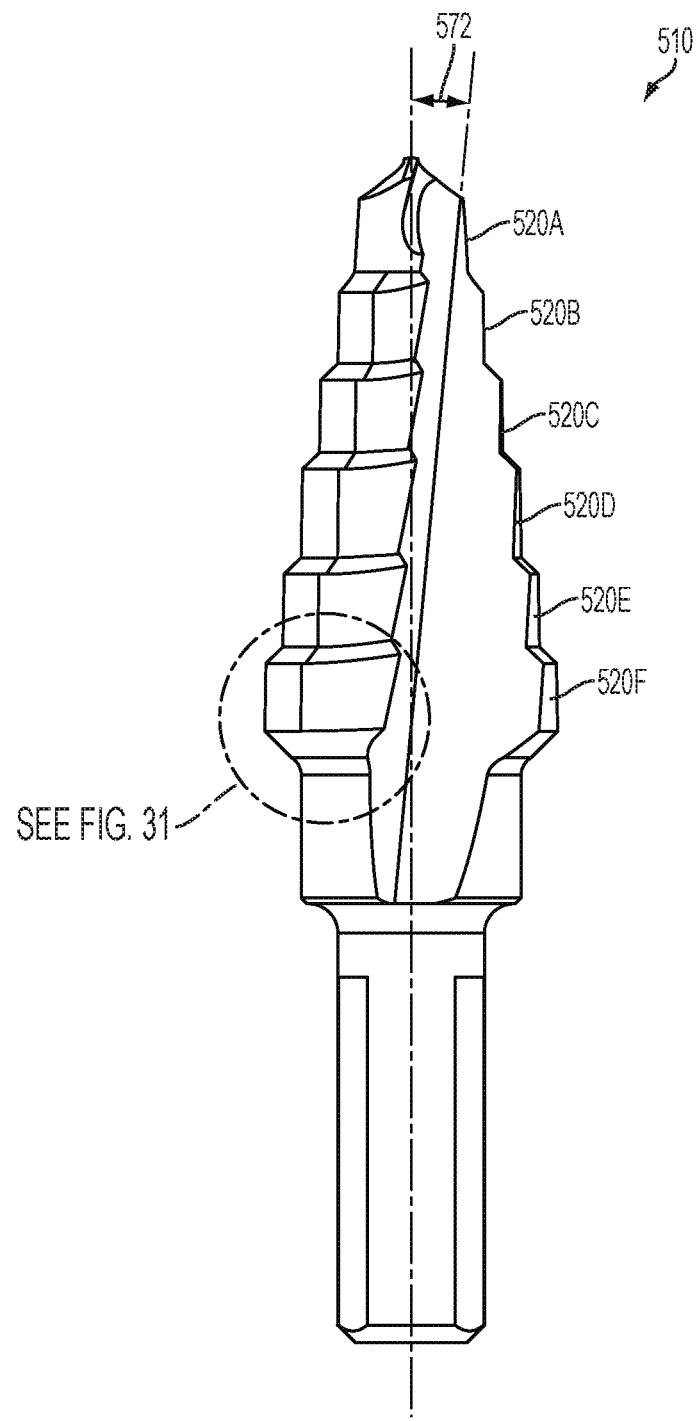
FIG. 29 is another side view of the step drill bit of FIG. 28 rotated 90 degrees.

The step drill bit 510 includes six axially stacked, progressively sized steps 520A-520F. A first step 520A has a diameter of approximately 0.188 inches, and a terminal step 520F has a diameter of approximately 0.505 inches. With reference to FIG. 28, the step drill bit 510 includes a first body flute angle 548 that is between approximately 8.8 degrees and approximately 10.8 degrees, and more specifically, approximately 9.8 degrees. With reference to FIG. 29, the step drill bit 510 includes a second body flute angle 572 that is between approximately 4.3 degrees and approximately 6.3 degrees, and more specifically, approximately 5.3 degrees.

Figure 30:
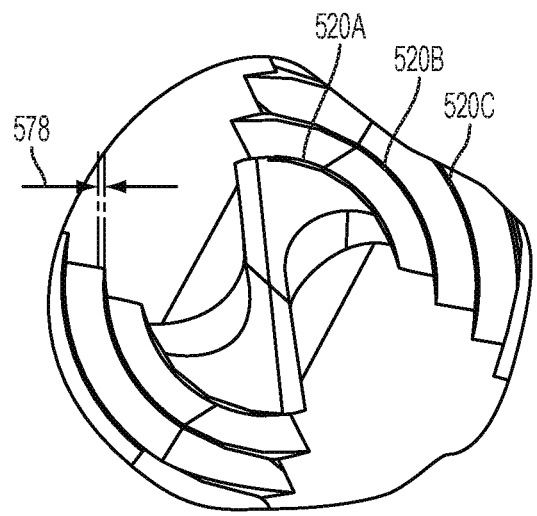
FIG. 30 is an enlarged top view of the step drill bit of FIG. 28.
Figure 31:
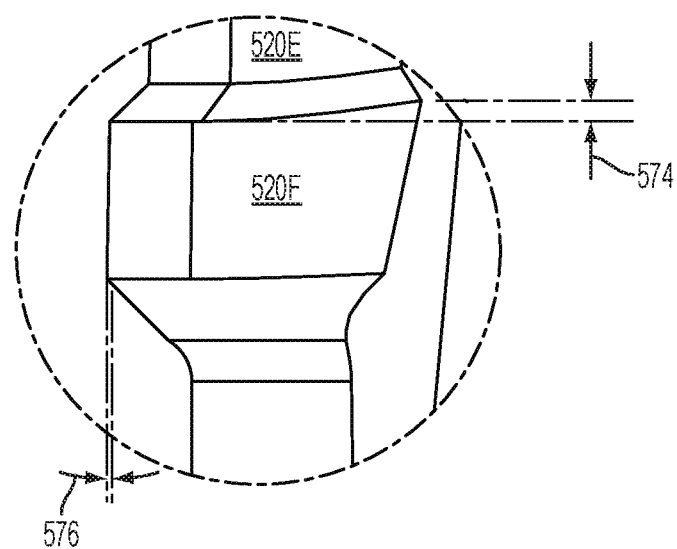
FIG. 31 is an enlarged, partial side view of a portion of the step drill bit of FIG. 29.

As shown in FIG. 30, the step drill bit 510 includes a radial relief 578 that is between approximately 0.002 inches and approximately 0.008 inches, and more specifically, approximately 0.005 inches. As shown in FIG. 31, the step drill bit 510 also includes a diametral relief 576 that is between approximately −1.5 degrees and approximately −0.5 degrees, and more specifically, approximately −1 degree. In addition, the step drill bit 510 includes an axial relief 574 that is between approximately 0.015 inches and approximately 0.021 inches, and more specifically, approximately 0.018 inches.

FIGS. 32-35 illustrate a step drill bit 610 according to another embodiment of the invention. The step drill bit 610 includes features similar to the step drill bit 10 of FIGS. 1-7, and like features have been given like reference numbers plus 600. The step drill bit 610 may include any combination of features, dimensions, or range of dimensions from the preceding or subsequent embodiments, but only features of the step drill bit 610 not yet discussed with respect to the previous embodiments are detailed below.

Figure 32:
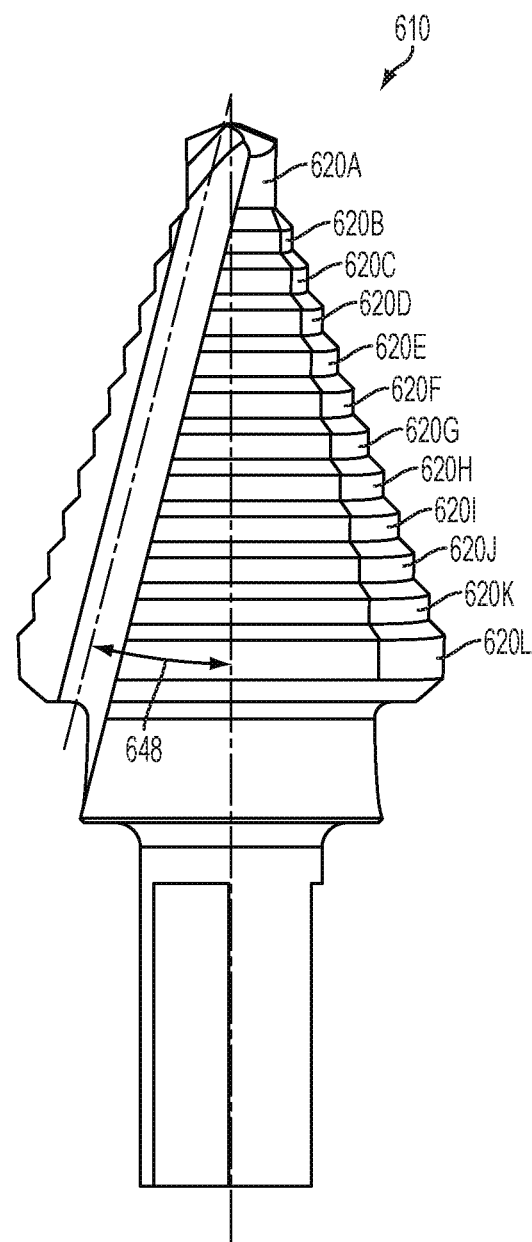
FIG. 32 is a side view of a step drill bit according to another embodiment of the invention.
Figure 33:
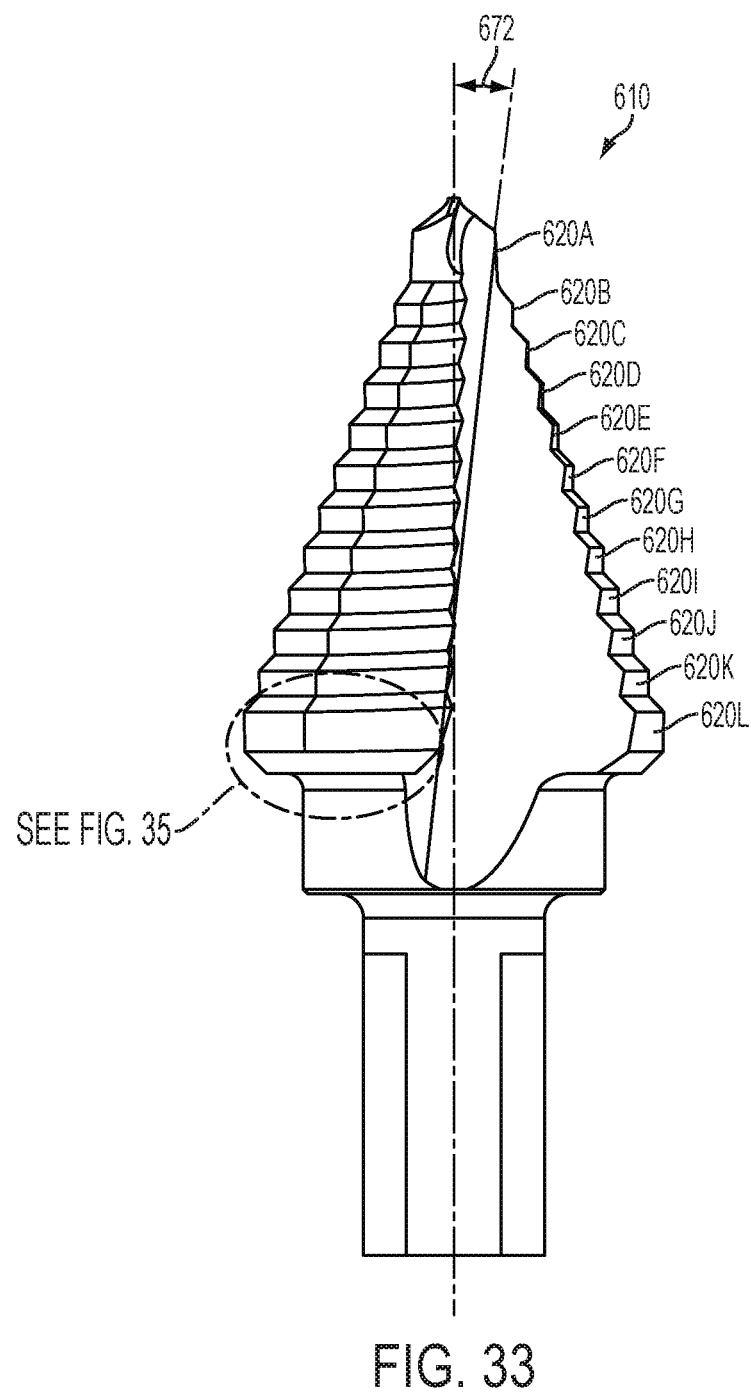
FIG. 33 is another side view of the step drill bit of FIG. 32 rotated 90 degrees.

The step drill bit 610 includes twelve axially stacked, progressively sized steps 620A-620L. A first step 620A has a diameter of approximately 0.188 inches, and a terminal step 620L has a diameter of approximately 0.88 inches. With reference to FIG. 32, the step drill bit 610 includes a first body flute angle 648 between approximately 13.3 degrees and approximately 15.3 degrees, and more specifically, approximately 14.3 degrees. With reference to FIG. 33, the step drill bit 610 includes a second body flute angle 672 between approximately 5.3 degrees and approximately 7.3 degrees, and more specifically, approximately 6.3 degrees.

Figure 34:
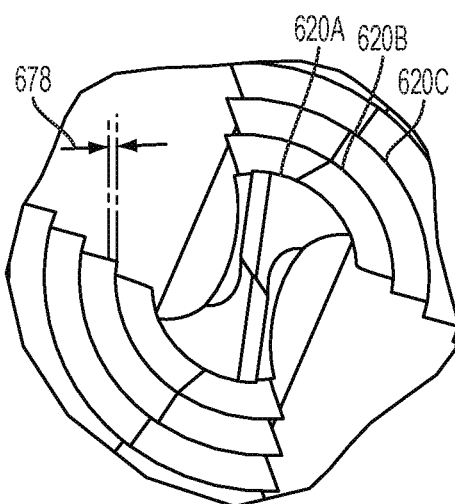
FIG. 34 is an enlarged top view of the step drill bit of FIG. 32.
Figure 35:
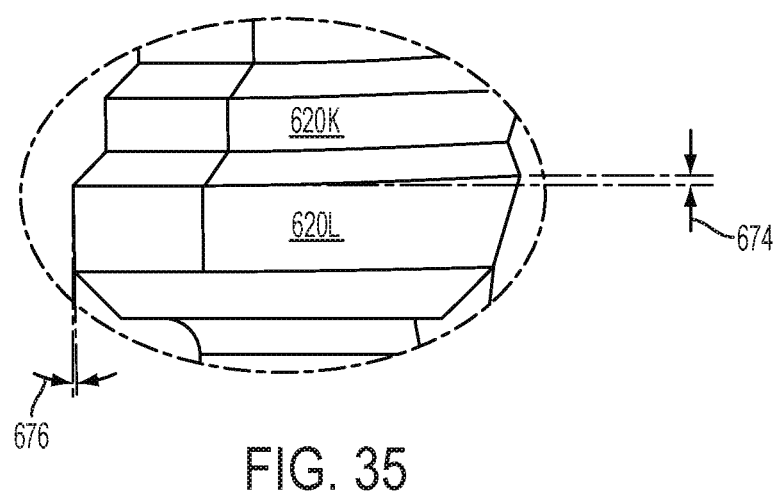
FIG. 35 is an enlarged, partial side view of a portion of the step drill bit of FIG. 33.
Figure 36:
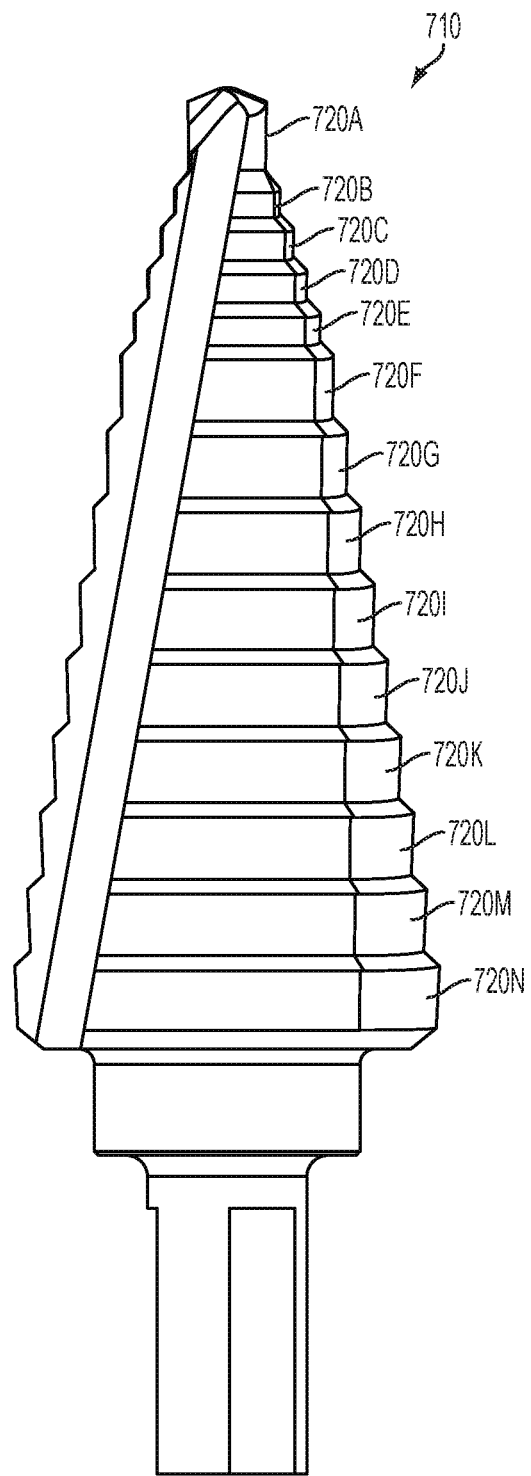
FIG. 36 is a side view of a step drill bit according to another embodiment of the invention.

As shown in FIG. 34, the step drill bit 610 includes a radial relief 678 that is between approximately 0.002 inches and approximately 0.008 inches, and more specifically, approximately 0.005 inches. As shown in FIG. 35, the step drill bit 610 includes a diametral relief 676 that is between approximately 0 degrees and approximately 1 degree, and more specifically, approximately 0.5 degrees. In addition, the step drill bit 610 includes an axial relief 674 that is between approximately 0.007 inches and approximately 0.013 inches, and more specifically, approximately 0.01 inches.

FIGS. 36-39 illustrate a step drill bit 710 according to another embodiment of the invention. The step drill bit 710 includes features similar to the step drill bit 10 of FIGS. 1-7, and like features have been given like reference numbers plus 700. The step drill bit 710 may include any combination of features, dimensions, or range of dimensions from the preceding or subsequent embodiments, but only features of the step drill bit 710 not yet discussed with respect to the previous embodiments are detailed below.

Figure 37:
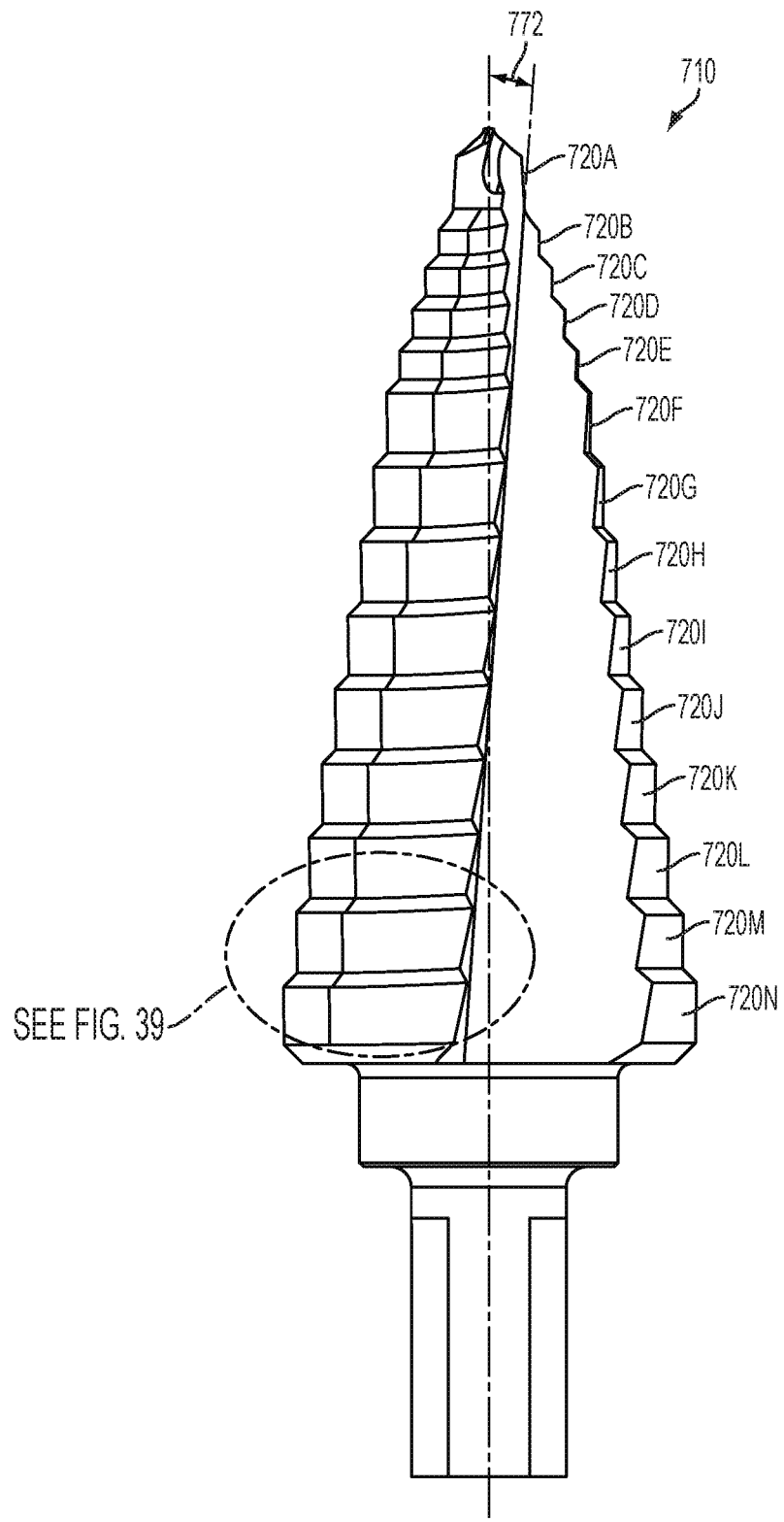
FIG. 37 is another side view of the step drill bit of FIG. 36 rotated 90 degrees.

The step drill bit 710 includes fourteen axially stacked, progressively sized steps 720A-720N. A first step 720A has a diameter of approximately 0.188 inches, and a terminal step 720N has a diameter of approximately 1 inch. With reference to FIG. 37, the step drill bit 710 includes a second body flute angle 772 that is between approximately 3 degrees and approximately 5 degrees, and more specifically, approximately 4 degrees.

Figure 38:
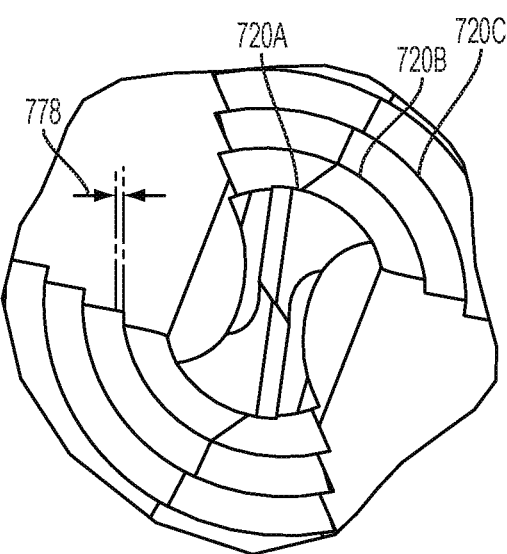
FIG. 38 is an enlarged top view of the step drill bit of FIG. 36.
Figure 39:
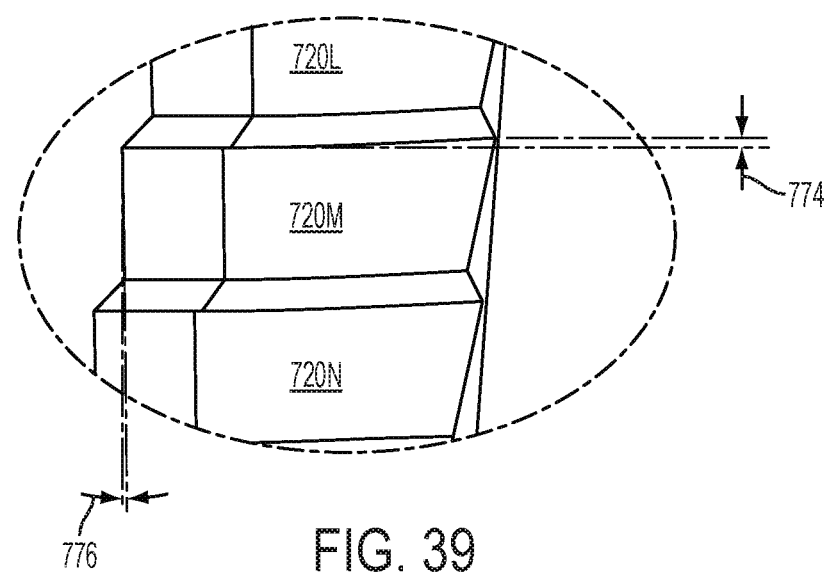
FIG. 39 is an enlarged, partial side view of a portion of the step drill bit of FIG. 36.

As shown in FIG. 38, the step drill bit 710 includes a radial relief 778 that is between approximately 0.002 inches and approximately 0.008 inches, and more specifically, approximately 0.005 inches. As shown in FIG. 39, the step drill bit 710 also includes a diametral relief 776 that is between approximately 0.5 degrees and approximately 1.5 degrees, and more specifically, approximately 1 degree. In addition, the step drill bit 710 includes an axial relief 774 that is between approximately 0.012 inches and approximately 0.018 inches, and more specifically, approximately 0.015 inches.

FIGS. 40-43 illustrate a step drill bit 810 according to another embodiment of the invention. The step drill bit 810 includes features similar to the step drill bit 10 of FIGS. 1-7, and like features have been given like reference numbers plus 800. The step drill bit 810 may include any combination of features, dimensions, or range of dimensions from the preceding or subsequent embodiments, but only features of the step drill bit 810 not yet discussed with respect to the previous embodiments are detailed below.

Figure 40:
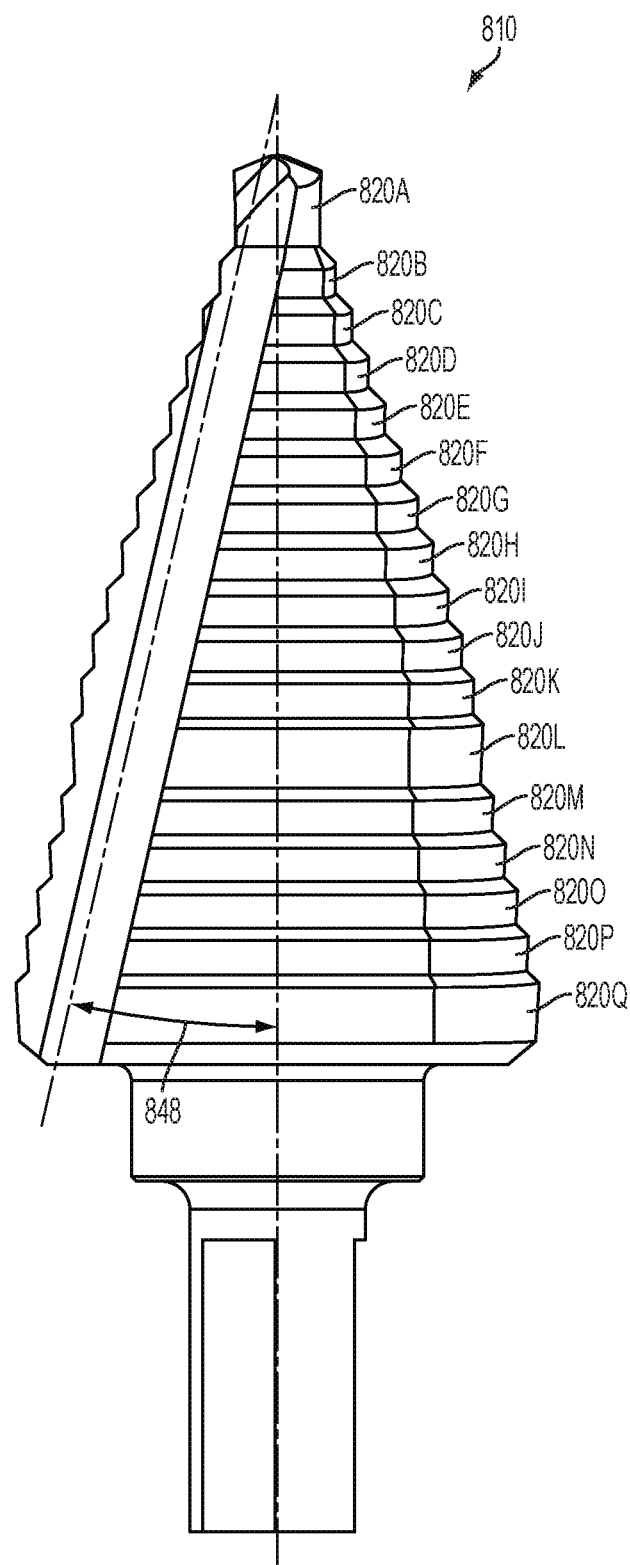
FIG. 40 is a side view of a step drill bit according to another embodiment of the invention.
Figure 41:
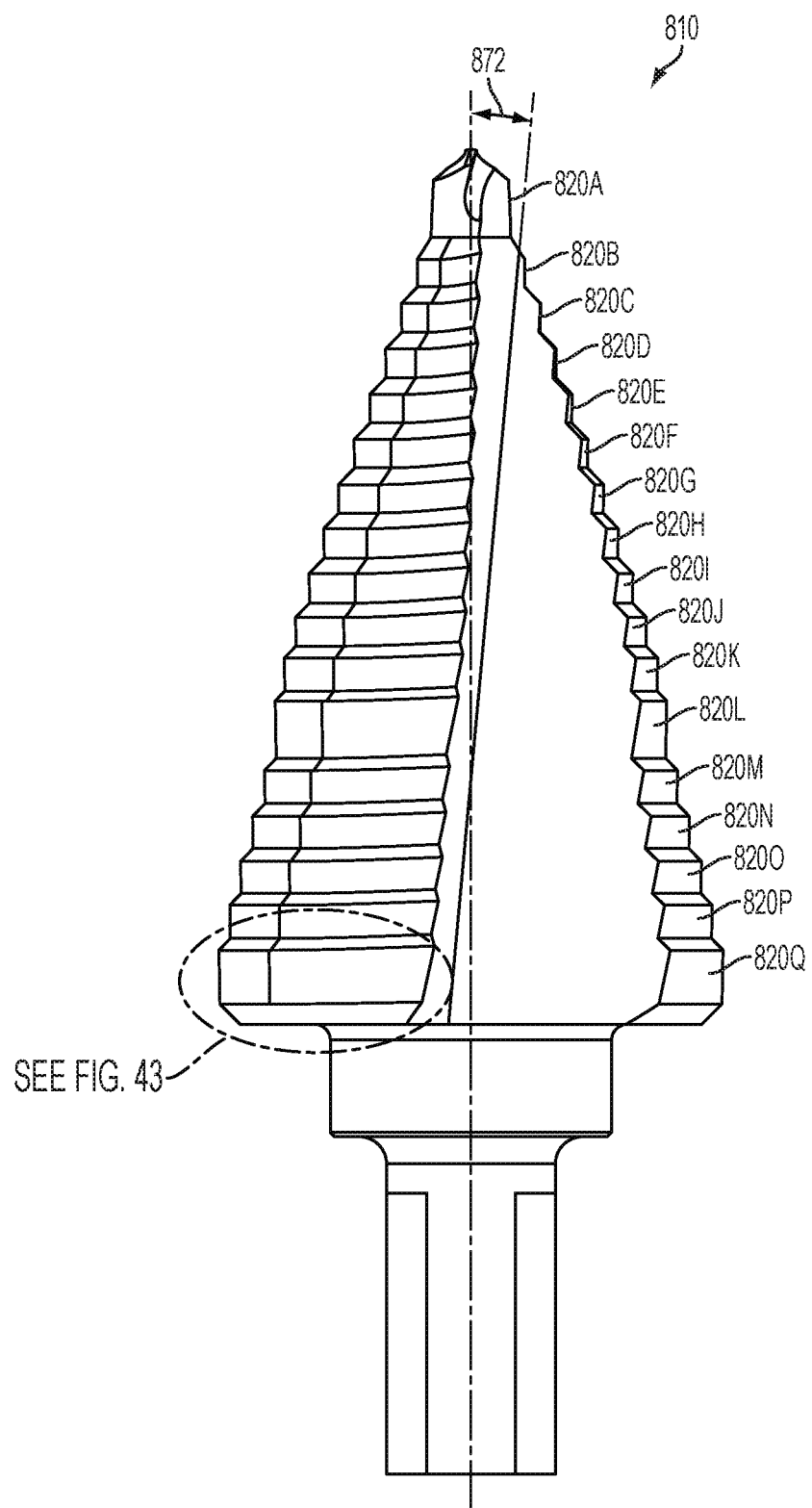
FIG. 41 is another side view of the step drill bit of FIG. 40 rotated 90 degrees.

The step drill bit 810 includes seventeen axially stacked, progressively sized steps 820A-820Q. A first step 820A has a diameter of approximately 0.188 inches, and a terminal step 820Q has a diameter of approximately 1.13 inches. With reference to FIG. 40, the step drill bit 810 includes a first body flute angle 848 that is between approximately 12 degrees and approximately 14 degrees, and more specifically, approximately 13 degrees. With reference to FIG. 41, the step drill bit 810 includes a second body flute angle 872 between approximately 4.2 degrees and approximately 6.2 degrees, and more specifically, approximately 5.2 degrees.

Figure 42:
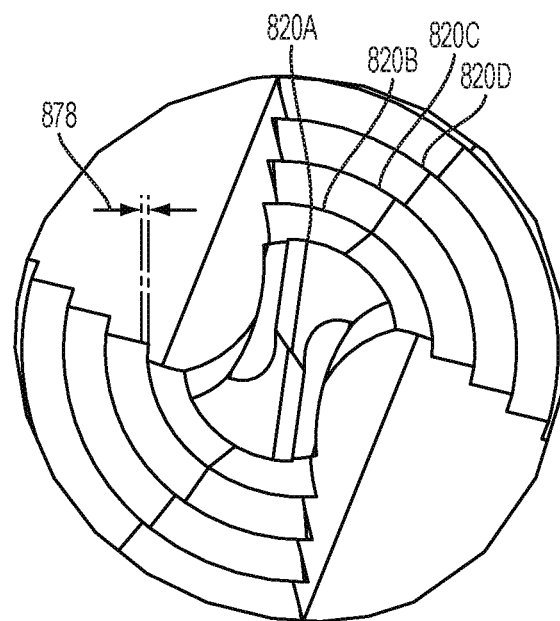
FIG. 42 is an enlarged top view of the step drill bit of FIG. 40.
Figure 43:
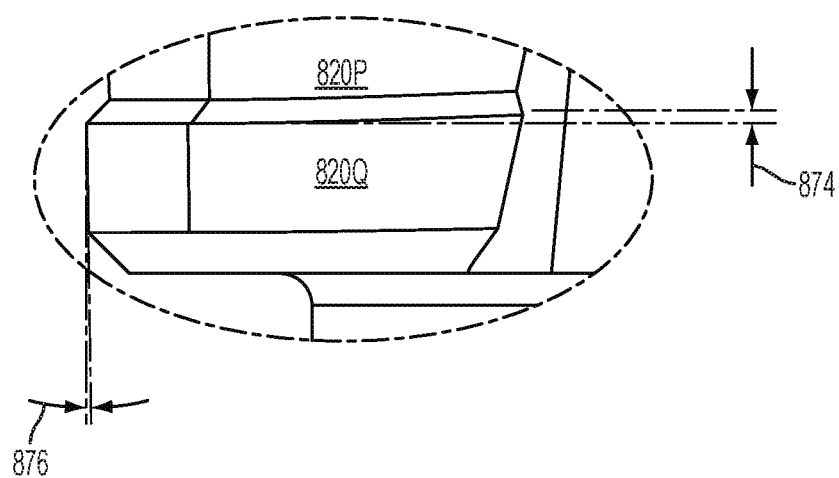
FIG. 43 is an enlarged, partial side view of a portion of the step drill bit of FIG. 41.

As shown in FIG. 42, the step drill bit 810 includes a radial relief 878 that is between approximately 0.002 inches and approximately 0.008 inches, and more specifically, approximately 0.005 inches. As shown in FIG. 43, the step drill bit 810 includes a diametral relief 876 that is between approximately 1 degree and approximately 2 degrees, and more specifically, approximately 1 degree. In addition, the step drill bit 810 includes an axial relief 874 between approximately 0.012 inches and approximately 0.018 inches, and more specifically, approximately 0.015 inches.

FIGS. 44-47 illustrate a step drill bit 910 according to another embodiment of the invention. The step drill bit 910 includes features similar to the step drill bit 10 of FIGS. 1-7, and like features have been given like reference numbers plus 900. The step drill bit 910 may include any combination of features, dimensions, or range of dimensions from the preceding or subsequent embodiments, but only features of the step drill bit 910 not yet discussed with respect to the previous embodiments are detailed below.

Figure 44:
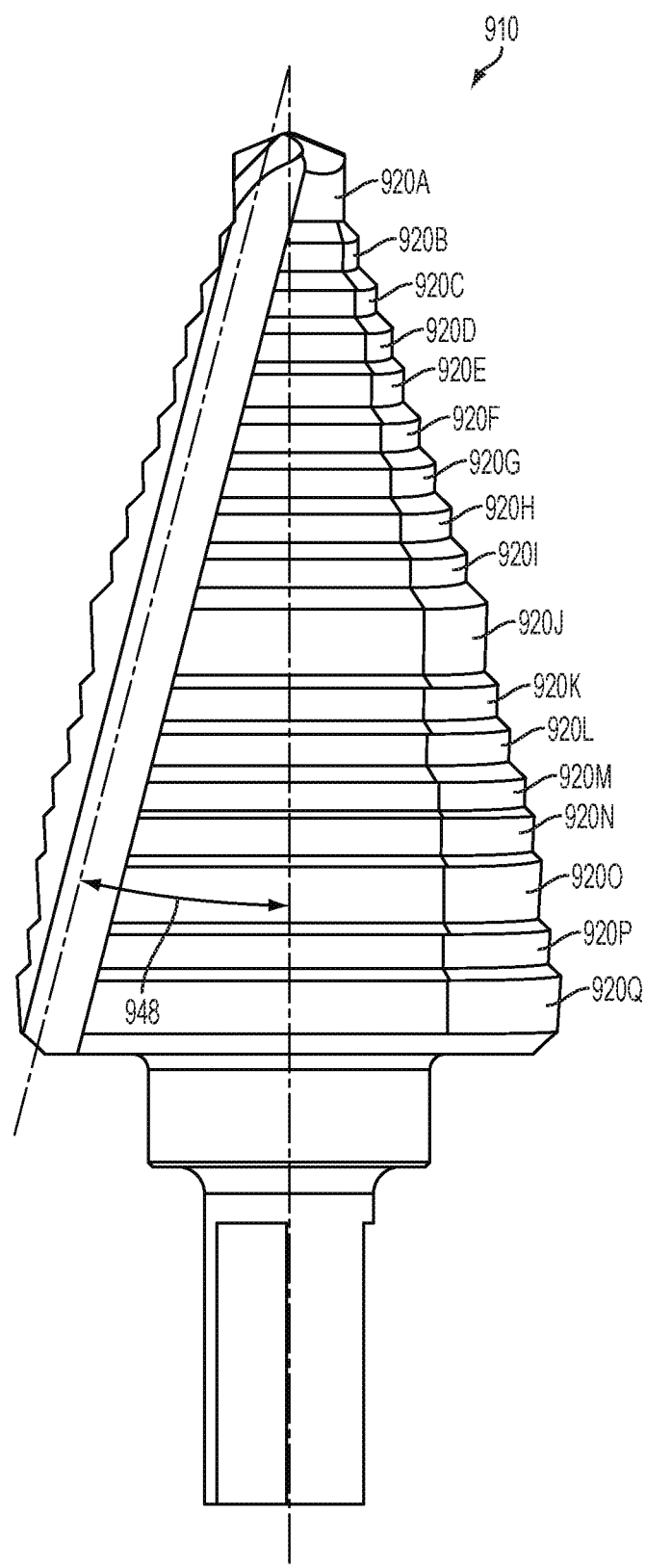
FIG. 44 is a side view of a step drill bit according to another embodiment of the invention.
Figure 45:
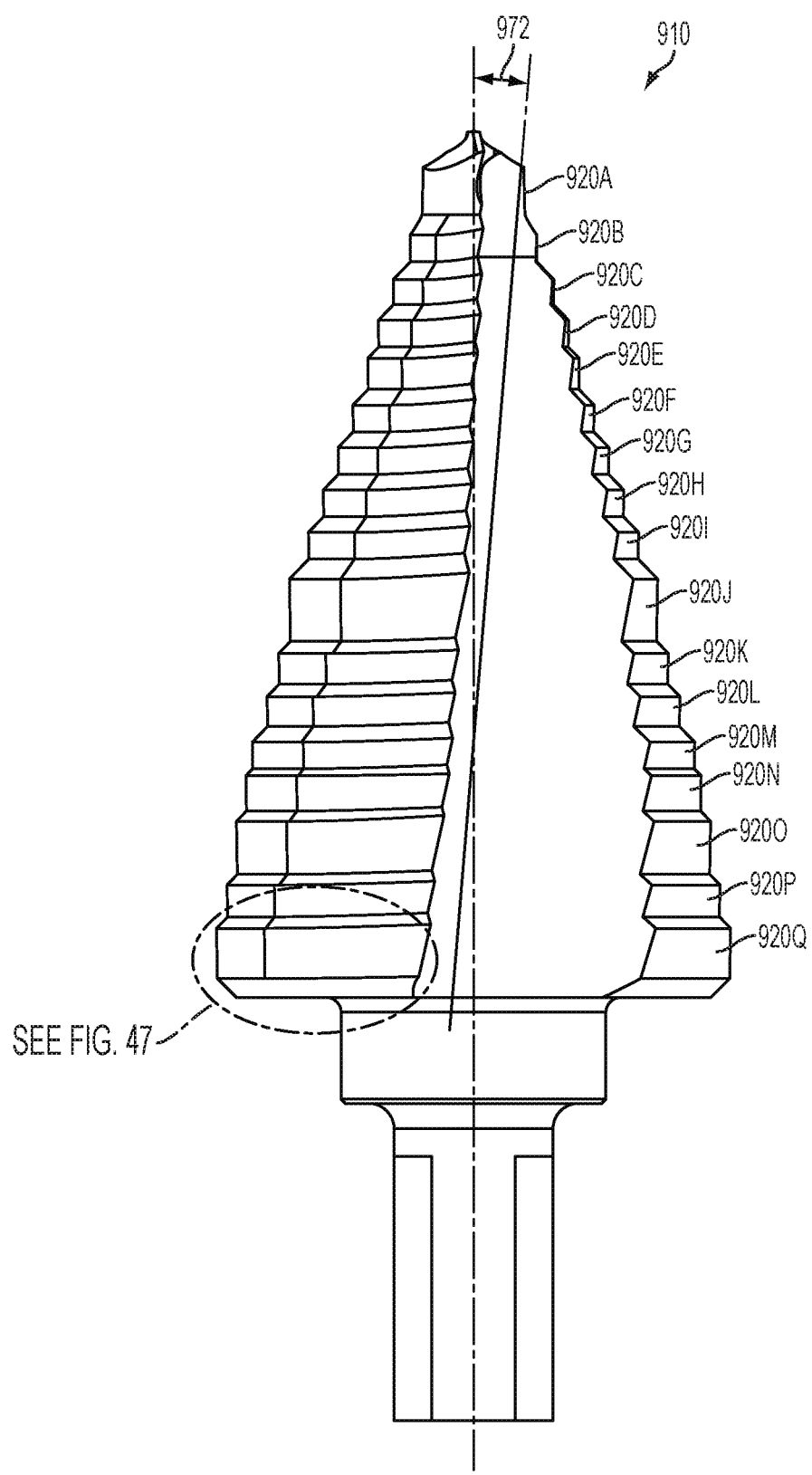
FIG. 45 is another side view of the step drill bit of FIG. 44 rotated 90 degrees.

The step drill bit 910 includes seventeen axially stacked, progressively sized steps 920A-920Q. A first step 920A has a diameter of approximately 0.25 inches, and a terminal step 920Q has a diameter of approximately 1.224 inches. With reference to FIG. 44, the step drill bit 910 includes a first body flute angle 948 that is between approximately 13.4 degrees and approximately 15.4 degrees, and more specifically, approximately 14.4 degrees. With reference to FIG. 45, the step drill bit 910 includes a second body flute angle 972 that is between approximately 3.7 degrees and approximately 5.7 degrees, and more specifically, approximately 4.7 degrees.

Figure 46:
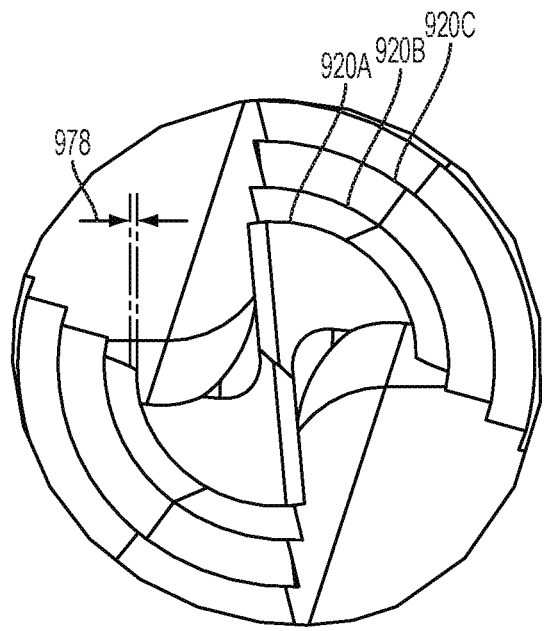
FIG. 46 is an enlarged top view of the step drill bit of FIG. 44.
Figure 47:
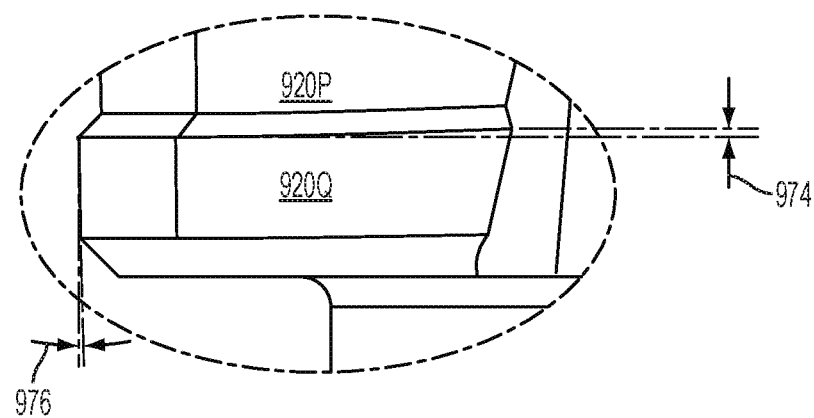
FIG. 47 is an enlarged, partial side view of a portion of the step drill bit of FIG. 45.

As shown in FIG. 46, the step drill bit 910 includes a radial relief 978 that is between approximately 0.002 inches and approximately 0.008 inches, and more specifically, approximately 0.005 inches. As shown in FIG. 47, the step drill bit 910 also includes a diametral relief 976 that is between approximately 0.5 degrees and approximately 1.5 degrees, and more specifically, approximately 1 degree. In addition, the step drill bit 910 includes an axial relief 974 that is between approximately 0.012 inches and approximately 0.018 inches, and more specifically, approximately 0.015 inches.

FIGS. 48-51 illustrate a step drill bit 1010 according to another embodiment of the invention. The step drill bit 1010 includes features similar to the step drill bit 10 of FIGS. 1-7, and like features have been given like reference numbers plus 1000. The step drill bit 1010 may include any combination of features, dimensions, or range of dimensions from the preceding or subsequent embodiments, but only features of the step drill bit 1010 not yet discussed with respect to the previous embodiments are detailed below.

Figure 48:
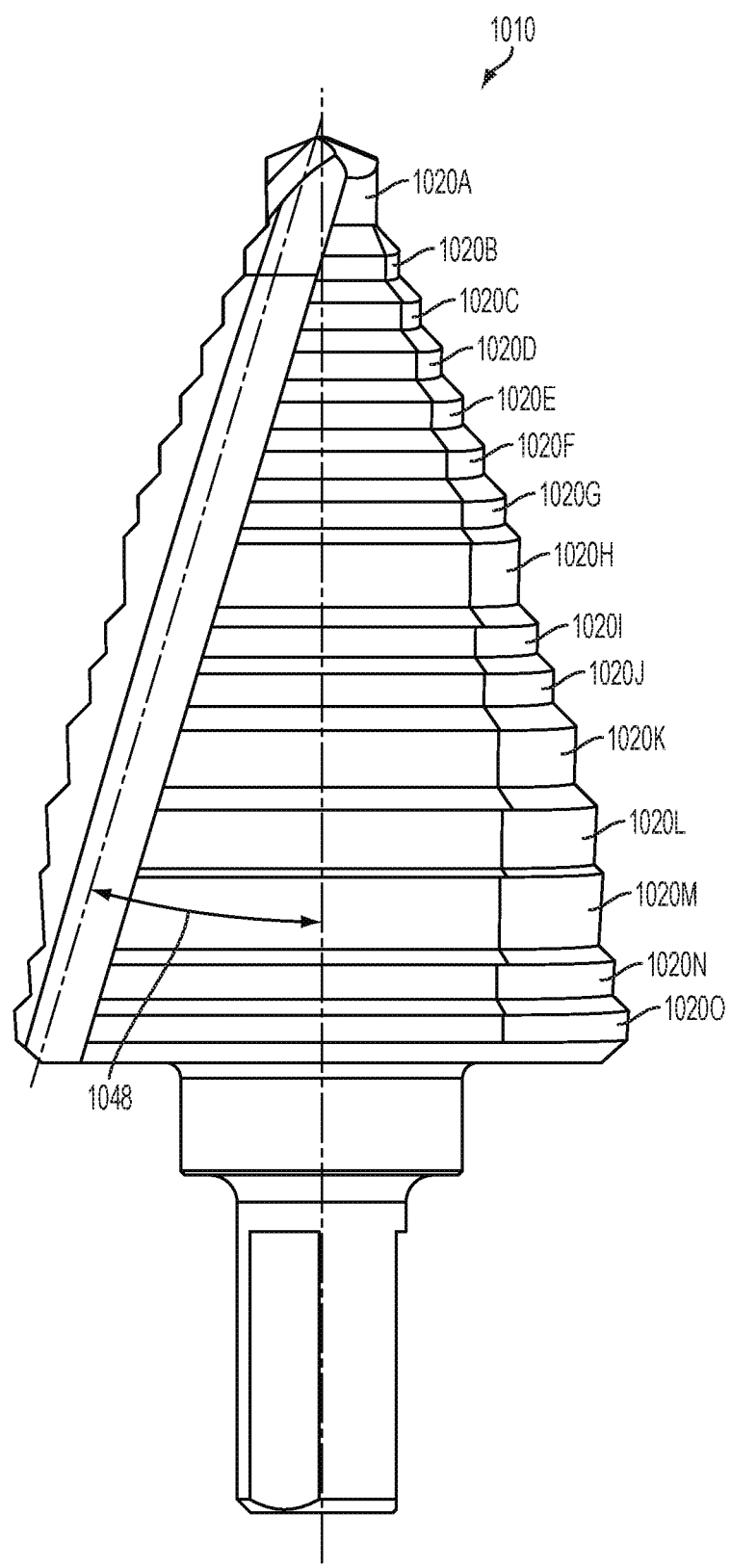
FIG. 48 is a side view of a step drill bit according to another embodiment of the invention.
Figure 49:
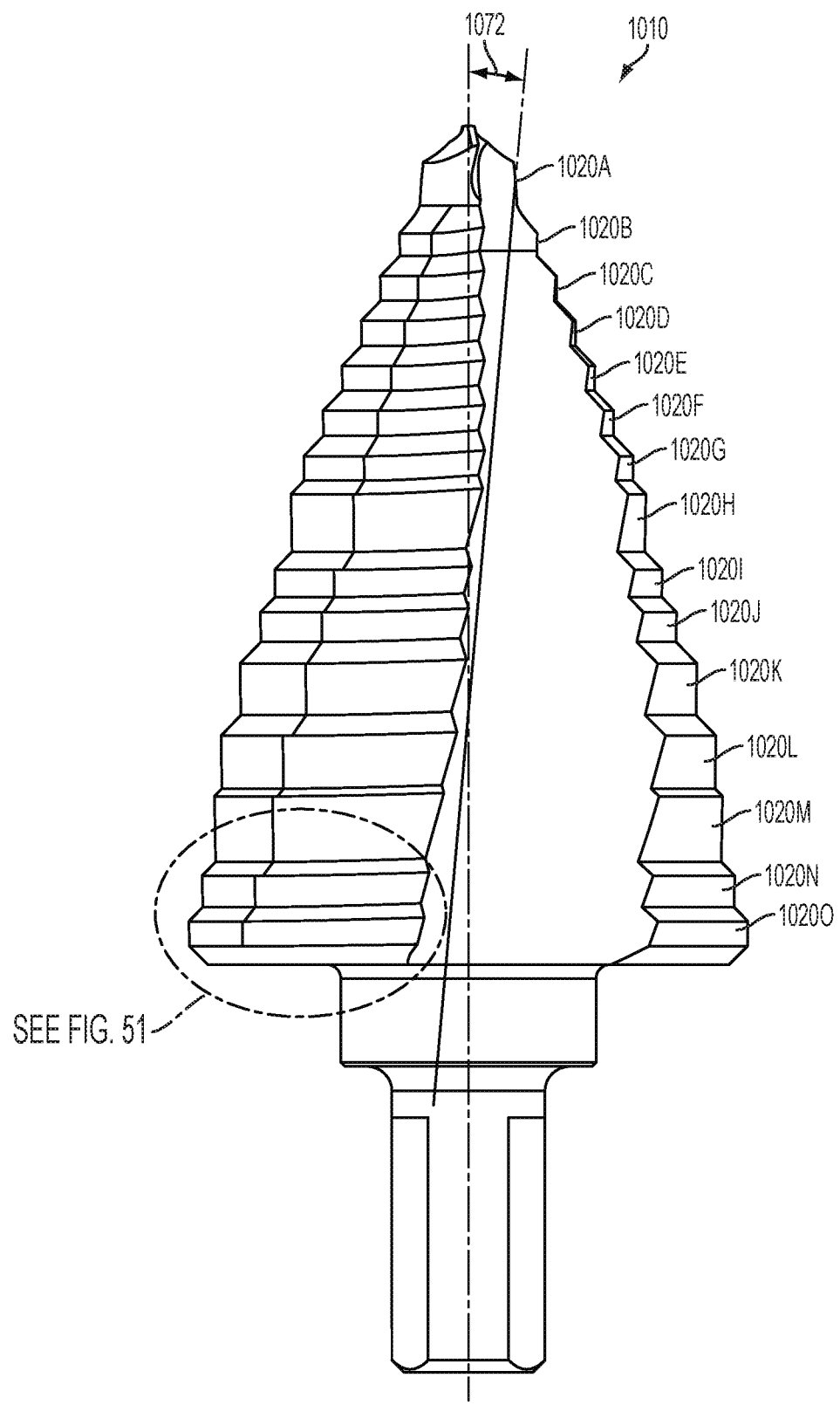
FIG. 49 is another side view of the step drill bit of FIG. 48 rotated 90 degrees.

The step drill bit 1010 includes fifteen axially stacked, progressively sized steps 1020A-1020O. A first step 1020A has a diameter of approximately 0.25 inches, and a terminal step 1020O has a diameter of approximately 1.38 inches. With reference to FIG. 48, the step drill bit 1010 includes a first body flute angle 1048 that is between approximately 15.7 degrees and approximately 17.7 degrees, and more specifically, approximately 16.7 degrees. With reference to FIG. 49, the step drill bit 1010 includes a second body flute angle 1072 that is between approximately 4.1 degrees and approximately 6.1 degrees, and more specifically, approximately 5.1 degrees.

Figure 50:
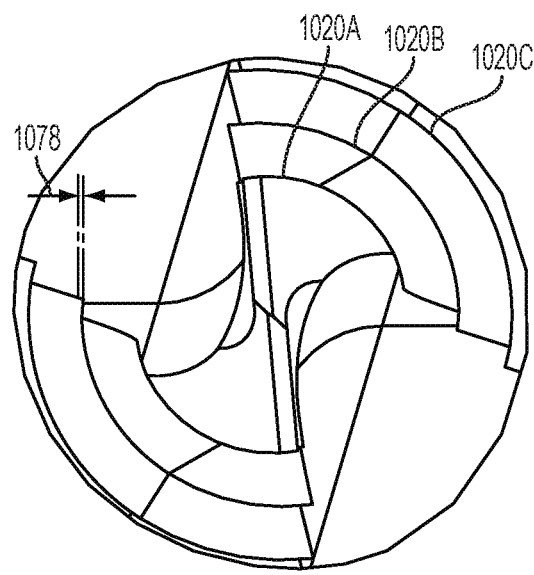
FIG. 50 is an enlarged top view of the step drill bit of FIG. 48.
Figure 51:
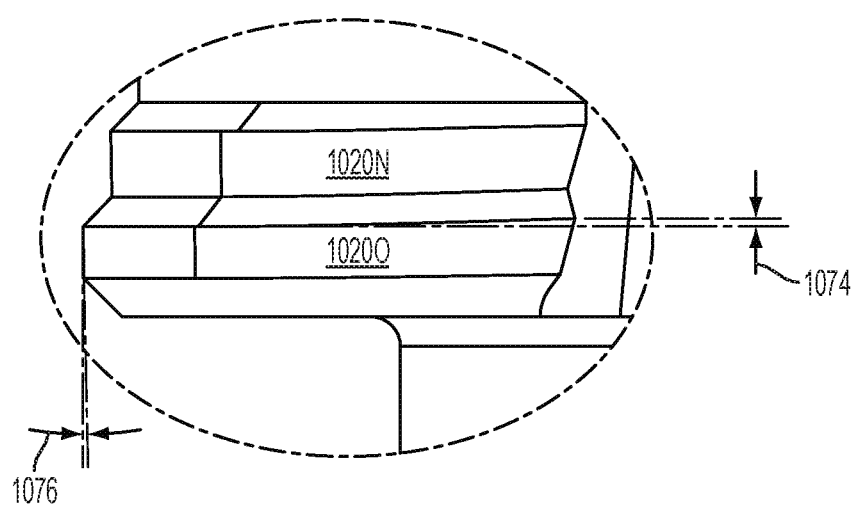
FIG. 51 is an enlarged, partial side view of a portion of the step drill bit of FIG. 49.

As shown in FIG. 50, the step drill bit 1010 includes a radial relief 1078 that is between approximately 0.002 inches and approximately 0.008 inches, and more specifically, approximately 0.005 inches. As shown in FIG. 51, the step drill bit 1010 also includes a diametral relief 1076 that is between approximately 0.5 degrees and approximately 1.5 degrees, and more specifically, approximately 1 degree. In addition, the step drill bit 1010 includes an axial relief 1074 that is between approximately 0.012 inches and approximately 0.018 inches, and more specifically, approximately 0.015 inches.

Figure 52:
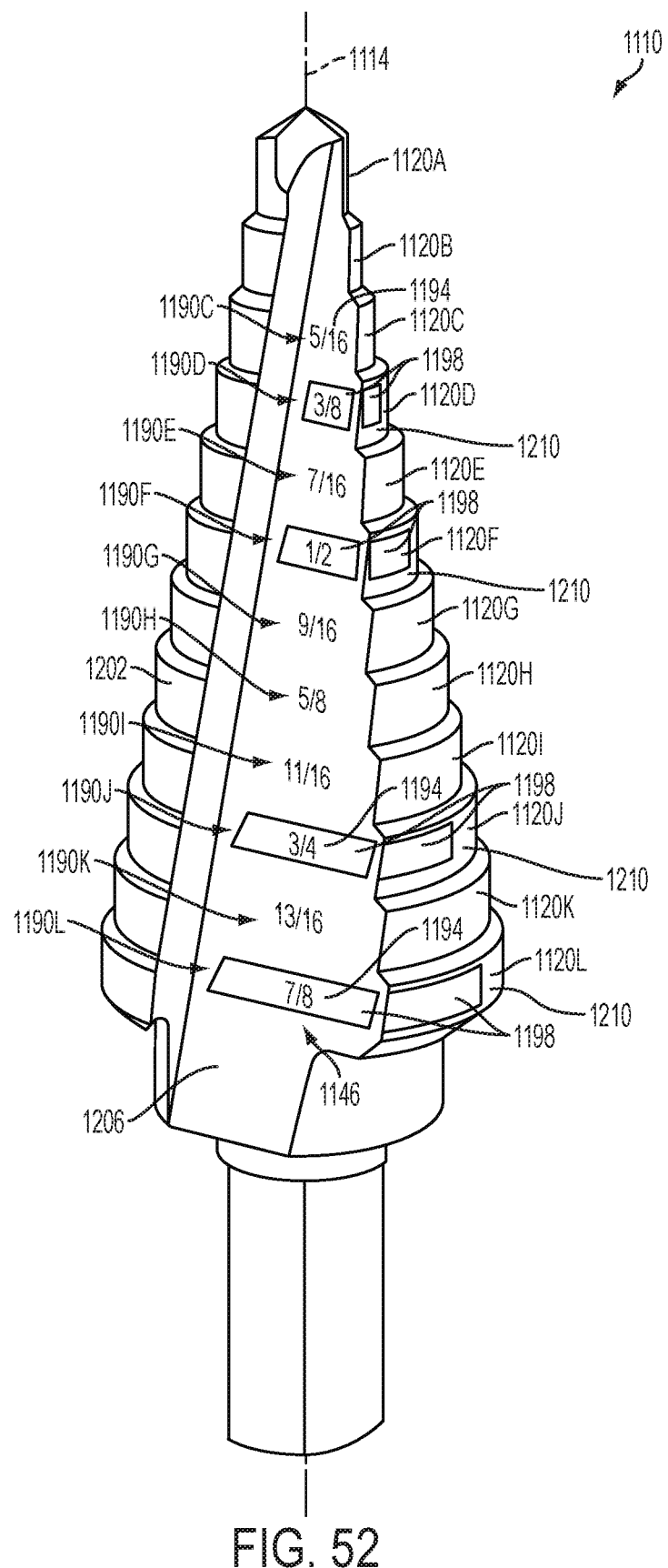
FIG. 52 is a perspective view of the step drill bit according to another embodiment of the invention.

FIG. 52 illustrates a step drill bit 1110 according to another embodiment of the invention. The step drill bit 1110 includes features similar to the step drill bit 10 of FIGS. 1-7, and like features have been given like reference numbers plus 1100. The step drill bit 1110 may include any combination of features, dimensions, or range of dimensions from the preceding embodiments, but only features of the step drill bit 1110 not yet discussed with respect to previous embodiments are detailed below.

The step drill bit 1110 includes twelve axially stacked, progressively sized steps 1120A-1120L and at least one body flute 1146 extending through the steps 1120A-1120L. The step drill bit 1110 also includes indicia 1190C-1190L applied to each step 1120A-1120L. In some embodiments, the indicia 1190C-1190L are laser etchings formed in an outer surface 1202 of the step drill bit 1110. The indicia 1190C-1190L contrast with a surface finish of the step drill bit 1110 to facilitate viewing the indicia 1190C-1190L. For example, the step drill bit 1110 may have a black oxide finish, and the indicia 1190C-1190L may be appropriately colored (e.g., white) to sufficiently standout from the black oxide finish.

The illustrated indicia 1190C-1190L include numbers 1194 and indicator bands 1198. The numbers 1194 are indicative of diameters of the corresponding steps 1120A-1120L. In the illustrated embodiment, the numbers 1190 are formed on a flute surface 1206 that partially defines the body flute 1146. By placing the numbers 1194 on the flute surface 1206 and within the body flute 1146, the numbers 1194 are less exposed to wear during operation of the step drill bit 1110.

The indicator bands 1198 provide markings to help differentiate some of the indicia (e.g., the indicia 1190D, 1190F, 1190J, 1190L) from other indicia. The illustrated indicator bands 1198 are positioned on non-adjacent steps so that two steps directly next to each other in the stack of steps do not both have indicator bands. For example, in the illustrated embodiment, the indicator bands 1198 are positioned on steps 1120D, 1120F, 1120J, 1120L corresponding to commonly used hole diameters (e.g., ⅜ inch, ½ inch, ¾ inch, and ⅞ inch). As such, when the drill bit 1110 is rotated about bit axis 1114 at operational speeds (e.g., 200-2000 rpm), the indicator bands 1198 provide readily identifiable visible bands for these particular steps. In other embodiments, the indicator bands 1198 may be positioned on steps having other diameters.

In the illustrated embodiment, the indicator bands 1198 are provided on both the flute surface 1206 and the outer surfaces 1210 of the corresponding steps (e.g., the steps 1120D, 1120F, 1120J, 1120L). The illustrated indicator bands 1198 are discontinuous in the transition from the flute surface 1206 to the outer surfaces 1210, but may alternatively be formed as continuous bands. In addition, the illustrated indicator bands 1198 do not extend entirely around the outer surface 1210 of each corresponding step. Instead, the indicator bands 1198 only extend around a portion of each outer surface 1210. In some embodiments, the indicator bands 1198 extend around less than half of the outer surface 1210 of each step. In the illustrated embodiment, the indicator bands 1198 extend around less than a quarter of the outer surface 1210 of each step. In other embodiments, the indicator bands 1198 may be provided only on the flute surface 1206 or only on the outer surfaces 1210 of the corresponding steps.

FIG. 53 provides tabulated data of a step drill bit according to the present invention. As shown in the tables, the step drill bit of the present invention provides improved performance when compared to competing products of comparable size. The test results for the step drill bit 10 are indicated as "Dual-Relief." A similar step drill bit design with only a single relief bit tip is indicated as "Single-Relief," and competitive designs are indicated by Brand A-E. The step drill bit 10 was tested under various testing conditions including a slide test (i.e., lower RPM testing) and a clausing test (i.e., higher RPM testing). Table 1 and Table 2 of FIG. 53 illustrate the number of holes drilled during life testing. Table 3 and Table 4 illustrate the time (in seconds) that it took to cut the holes identified in Tables 1 and 2. In addition, Table 5 illustrates the time it takes for a bit tip to penetrate a work piece for the clausing test. As noted in the tables, the step drill bit 10 has improved performance over the single relief bit tip design and the other brands with a larger number of holes drilled and shorter cut times under both testing conditions.

Figure 54:
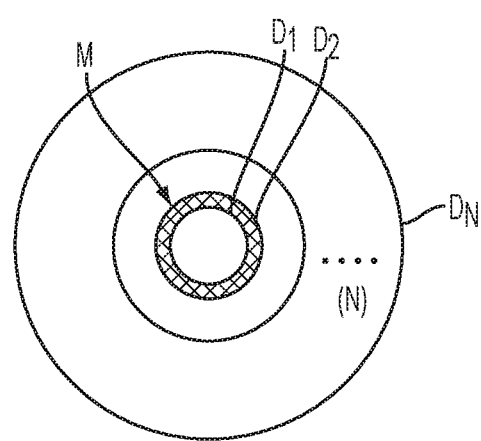
FIG. 54 is a schematic cross-sectional view of a step drill bit illustrating a jam-free design criteria.

The increase in performance illustrated by FIG. 53 is due, in part, to step drill bits of the previously described embodiments adhering to a jam-resistant design. Especially where the step drill bit will be used with a cordless drill, jamming of the step drill bit may be significantly reduced by limiting the diameter difference between adjacent steps. With reference to FIG. 54, each step drill bit has a first step diameter $D_1$, a terminal step diameter $D_N$, and a total of N steps. The steps have progressively increasing diameters from the first step to the terminal step to achieve the terminal diameter $D_N$ hole size. The number of steps N needed to achieve the finishing diameter $D_N$ should be minimized to keep the bit compact (i.e., shorter along the bit rotational axis), while maintaining adequate axial length to allow for reasonable workpiece thickness. However, in order to achieve a jam-resistant design, an area of material M removed with each successive step should remain below a pre-determined threshold. The area of material M removed between adjacent steps is equal to the difference in hole cross-sectional areas defined by adjacent steps n and n−1 (i.e., $M=\frac{1}{4}\pi(D_n^2-D_{n-1}^2)$). In some embodiments, the difference in hole diameters formed by each pair of adjacent steps (which is the same as the difference in diameters of each pair of adjacent steps) is less than 0.1 inches. More specifically, the difference in hole diameters is approximately 0.0625 inches (or 1/16 inches).

The increase in performance illustrated in FIG. 53 is also partly due to the axial, diametral, and radial reliefs discussed above. The axial relief in particular helps increase feed rate of the step drill bit through a work piece. A larger axial relief generally increases the feed rate to, thereby, decrease the cut time for the step drill bit to drill the number of holes tabulated in FIG. 53.

Thus, the invention provides an improved step drill bit. Although the invention has been described with reference to certain preferred embodiments, variations and modifications exist within the scope and spirit of one or more independent aspects of the invention as described. Various features and advantages of the invention are set forth in the following claims.

What is claimed is:

1. A drill bit comprising:
a shank extending along a bit axis;
a transition portion coupled to the shank; and
a body portion having a distal end and defining a plurality of axially stacked, progressively sized steps including a first step at the distal end and a terminal step coupled to the transition portion, each step including an axial relief formed on an upper edge of the step, the body portion further defining a body flute extending from the first step to the transition portion;
wherein a difference in hole diameters formed by each pair of adjacent steps of the plurality of steps is less than 0.1 inches; and
wherein the axial relief of each step is between approximately 0.007 inches and approximately 0.021 inches.

2. The drill bit of claim 1, wherein the difference in hole diameters formed by each pair of adjacent steps of the plurality of steps is approximately 0.0625 inches.

3. The drill bit of claim 1, wherein each step also includes a diametral relief.

4. The drill bit of claim 3, wherein the diametral relief of each step is between approximately -1 degree and approximately 2 degrees.

5. The drill bit of claim 1, wherein each step also includes a radial relief.

6. The drill bit of claim 5, wherein the radial relief of each step is between approximately 0.002 inches and approximately 0.008 inches.

7. The drill bit of claim 1, wherein the body portion further includes a step chamfer formed between adjacent steps.

8. The drill bit of claim 7, wherein each step chamfer has a ramp angle measured between a surface of the step chamfer and a plane extending perpendicular to the bit axis, and wherein each ramp angle is between approximately 40 degrees and approximately 50 degrees.

9. The drill bit of claim 1, wherein the body further defines a second body flute extending from the first step to the transition portion.

10. The drill bit of claim 1, wherein the plurality of steps includes between six steps and seventeen steps.

11. The drill bit of claim 1, wherein at least two of the steps have respective step heights that are identical to each other.

12. The drill bit of claim 11, wherein at least one of the steps has a greater step height than others of the steps.

13. A drill bit comprising:
a shank extending along a bit axis;
a body portion coupled to the shank, the body portion having a distal end and defining a plurality of axially stacked, progressively sized steps including a first step at the distal end and a terminal step nearer the shank than the first step, each step including an axial relief formed on an upper edge of the step, the body portion further defining a body flute extending from the first step to the terminal step; and
a bit tip disposed at the distal end of the body portion and having a chisel edge intersecting the bit axis, a first chisel surface being on one side of the chisel edge, and a second chisel surface being on an opposite side of the chisel edge, the first chisel surface defining a first relief angle that is between 10 degrees and 20 degrees, and the second chisel surface defining a second relief angle that is between 25 degrees and 35 degrees;
wherein a difference in hole diameters formed by each pair of adjacent steps of the plurality of steps is less than 0.1 inches.

14. The drill bit of claim 13, wherein each step also includes a diametral relief.

15. The drill bit of claim 13, wherein each step also includes a radial relief.

16. The drill bit of claim 13, wherein the body portion further includes a step chamfer formed between adjacent steps.

17. The drill bit of claim 13, wherein the body further defines a second body flute extending from the first step to the terminal step.

18. The drill bit of claim 13, wherein the plurality of steps includes between six steps and seventeen steps.

19. The drill bit of claim 13, further comprising a transition portion coupled to the shank and to the terminal step.

20. A drill bit comprising:

a bit tip;

a shank opposite the tip and extending along a bit axis; and a body portion having a plurality of axially stacked, progressively sized steps between the bit tip and the shank, the plurality of steps including a first step adjacent the bit tip and a terminal step adjacent the shank, each step including an axial relief formed on an upper edge of the step, the body portion further defining a body flute extending from the first step to the shank, the body defining a length between the first step and the terminal step in a direction parallel to the bit axis;

wherein a difference in hole diameters formed by each pair of adjacent steps of the plurality of steps is less than 0.1 inches; and wherein one step of the plurality of steps has a greater step height than a plurality of consecutive adjacent steps, wherein the plurality of consecutive adjacent steps includes at least six steps, wherein the plurality of consecutive adjacent steps is closer than the one step to the bit tip, and wherein the one step is positioned at least midway along the length measured in a direction from the first step to the terminal step.

\* \* \* \* \*